US010732706B2

(12) United States Patent
Eronen et al.

(10) Patent No.: US 10,732,706 B2
(45) Date of Patent: Aug. 4, 2020

(54) PROVISION OF VIRTUAL REALITY CONTENT

(71) Applicant: Nokia Technologies Oy, Espoo (FI)

(72) Inventors: Antti Johannes Eronen, Tampere (FI); Arto Juhani Lehtiniemi, Lempaala (FI); Jussi Artturi Leppanen, Tampere (FI); Juha Henrik Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 16/012,113

(22) Filed: Jun. 19, 2018

(65) Prior Publication Data
US 2019/0138085 A1 May 9, 2019

(30) Foreign Application Priority Data

Jun. 20, 2017 (EP) .................................... 17176756

(51) Int. Cl.
G06F 3/01 (2006.01)
G06F 3/0481 (2013.01)
G06F 3/0482 (2013.01)
(52) U.S. Cl.
CPC .............. G06F 3/012 (2013.01); G06F 3/011 (2013.01); G06F 3/017 (2013.01); G06F 3/0482 (2013.01); G06F 3/04815 (2013.01)

(58) Field of Classification Search
None
See application file for complete search history.

(56) References Cited

U.S. PATENT DOCUMENTS

| 2013/0225305 A1* | 8/2013 | Yang ....................... A63F 13/00 473/152 |
| 2014/0192087 A1* | 7/2014 | Frost ....................... G06F 3/011 345/633 |
| 2016/0093078 A1* | 3/2016 | Davis ..................... G06F 16/58 345/629 |
| 2017/0228931 A1* | 8/2017 | Parker ................... G06T 19/006 |

* cited by examiner

Primary Examiner — Stephen T. Reed
(74) Attorney, Agent, or Firm — Harrington & Smith

(57) ABSTRACT

A method is disclosed including providing a plurality of sets of virtual reality video content, the sets representing respective three-dimensional virtual spaces within which a user can be immersed and being associated with respective three-dimensional portions of a real-world space such that, when rendered to a user device, there is a partial overlap between at least two virtual spaces defining one or more overlapping zones. The method may also include determining the position of a user device within the real-world space and rendering one or more of the virtual spaces, or representation(s) thereof, for display to the user device dependent on the determined position or movement within the real-world space.

19 Claims, 17 Drawing Sheets

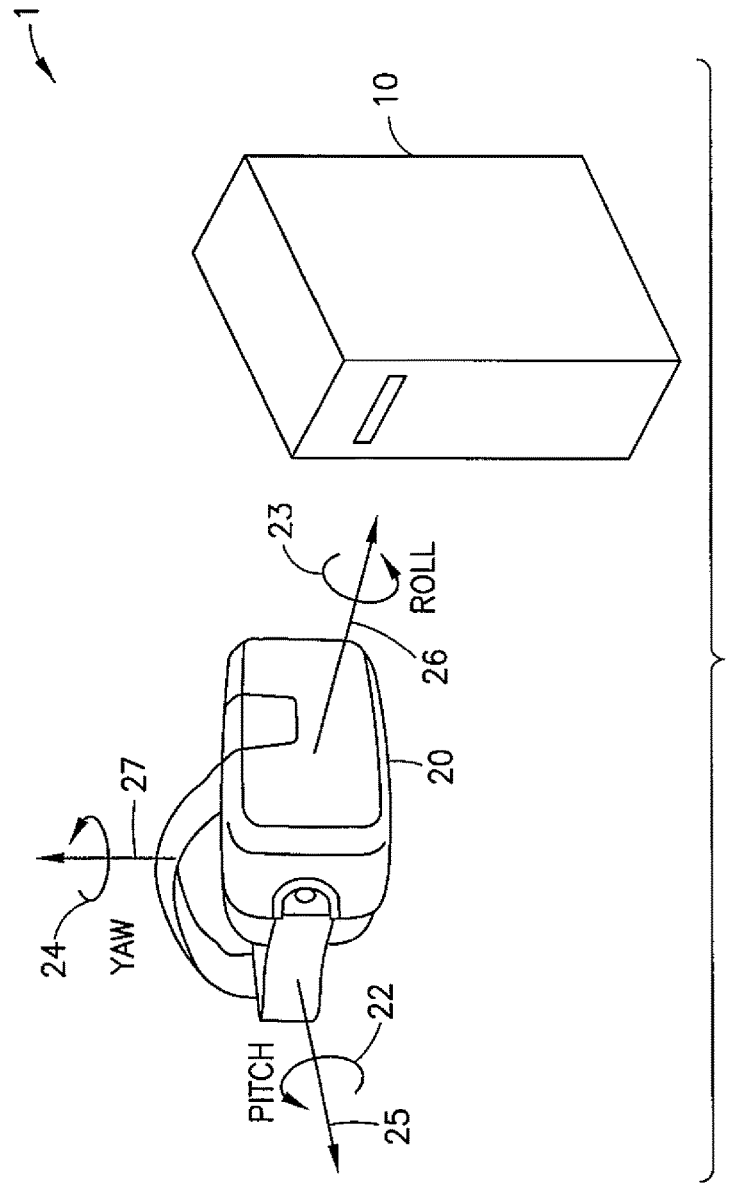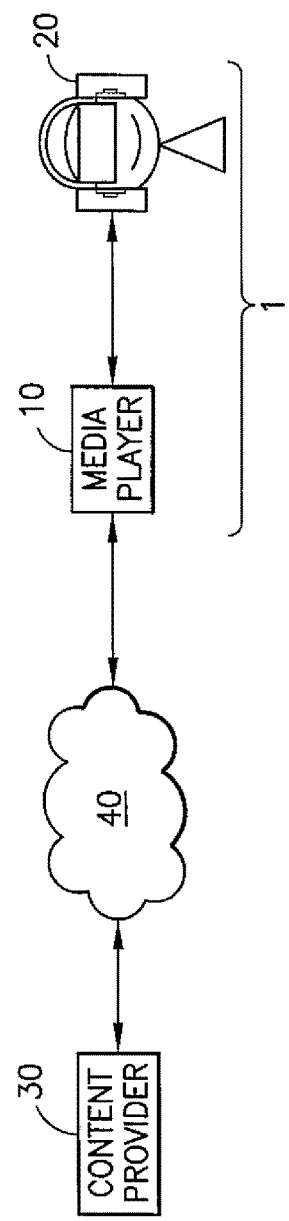

PROVISION OF VIRTUAL REALITY CONTENT

FIELD OF THE INVENTION

This invention relates to virtual reality, particularly the provision of virtual reality content for display at a user display system, e.g. a virtual reality headset.

BACKGROUND OF THE INVENTION

Virtual reality (VR) is a rapidly developing area of technology in which video content is provided, e.g. streamed, to a VR display system. As is known, the VR display system may be provided with a live or stored feed from a video content source, the feed representing a VR space or world for immersive output through the display system. In some embodiments, audio is provided, which may be spatial audio. A virtual space or virtual world is any computer-generated version of a space, for example a captured real world space, in which a user can be immersed through a display system such as a VR headset. A VR headset may be configured to provide VR video and audio content to the user, e.g. through the use of a pair of video screens and headphones incorporated within the headset.

Position and/or movement of the user device can enhance the immersive experience. Currently, most VR headsets use so-called three degrees of freedom (3DoF) which means that the head movement in the yaw, pitch and roll axes are measured and determine what the user sees. This facilitates the scene remaining largely static in a single location as the user rotates their head. A next stage may be referred to as 3DoF+, which may facilitate limited translational movement in Euclidean space in the range of, e.g. tens of centimetres, around a location. A yet further stage is a six degrees of freedom (6DoF) VR system, where the user is able to freely move in the Euclidean space and rotate their head in the yaw, pitch and roll axes. 6DoF VR systems and methods will enable the provision and consumption of volumetric VR content.

Volumetric VR content comprises data representing spaces and/or objects in three-dimensions from all angles, enabling the user to move fully around the spaces and/or objects to view them from any angle. For example, a person or object may be fully scanned and reproduced within a real-world space. When rendered to a VR headset, the user may 'walk around' the person or object and view them from the front, the sides and from behind.

A challenge exists in terms of providing a plurality of VR spaces or worlds for users located in a real-world space having limited dimensions. For example, a user may wish to select one or more VR spaces or worlds from a library of content for consumption in a room at home, at work or at school.

For the avoidance of doubt, references to VR are also intended to cover related technologies such as augmented reality (AR).

SUMMARY OF THE INVENTION

A first aspect of the invention provides a method comprising: providing a plurality of sets of virtual reality video content, the sets representing respective three-dimensional virtual spaces within which a user can be immersed and being associated with respective three-dimensional portions of a real-world space such that, when rendered to a user device, there is a partial overlap between at least two virtual spaces defining one or more overlapping zones; determining the position of a user device within the real-world space; and rendering one or more of the virtual spaces, or representation(s) thereof, for display to the user device dependent on the determined position or movement within the real-world space.

The method may further comprise rendering user-selectable representations indicative of the virtual spaces to the user device.

Selection of a particular representation may cause its respective virtual space to be rendered at least partially within its associated portion of the real-world space.

Selection of a particular representation may cause the virtual space to expand into its associated portion of the real-world space.

At least one representation may be user-selectable by means of detecting a user gesture.

At least one representation may be rendered so as to appear on or adjacent a respective wall or upright surface of the real-world space.

The method may further comprise providing a user-interface for rendering to the user device, proximate to the determined current position and at or near the floor of the real-world space, the user-interface when rendered comprising the user-selectable representations arranged as respective segments indicative of the relative spatial locations or directions of the virtual spaces.

The user-interface, when rendered, may comprise a central segment indicative of a current virtual space within which a user is immersed and one or more outer segments indicative of one or more other virtual space(s).

Selection of one or more of the outer segments may be effective to cause the associated virtual space to be rendered into its associated portion of the real-world space and other, already-rendered virtual space(s), to be diminished.

The user-selectable representations may be displayed when the user is not immersed in any of the virtual spaces.

The rendered overlapping zone for first and second virtual spaces may comprise video content from the first and second virtual spaces if the determined position is outside of the first and second virtual spaces.

The video content for the overlapping zone may be rendered in semi-transparent form.

If the determined position is within a first virtual space, outside of an overlapping zone with a second virtual space, only the first virtual space may be rendered to the user device.

If the determined user position subsequently moves from said first virtual space to within the overlapping zone with the second virtual space, only the first virtual space may be rendered to the user device.

If the determined user position subsequently moves from the overlapping zone to said second virtual space, only the second virtual space may be rendered to the user device.

If the determined user position subsequently moves from said second virtual space, back to the overlapping zone, only the second virtual space may be rendered to the user device.

A plurality of different virtual spaces may be associated with the same portion of real-world space, a new virtual space being rendered in place of the current virtual space dependent on a parameter or user interaction.

The current virtual space may have a finite duration and the new virtual space may be rendered in its place after expiry of said duration.

A further aspect of the invention provides a computer program comprising instructions that when executed by a computer control it to perform the method of any preceding definition.

A further aspect of the invention provides an apparatus configured to perform the method of any preceding method definition.

A further aspect of the invention provides a non-transitory computer-readable medium having stored thereon computer-readable code, which, when executed by at least one processor, causes the at least one processor to perform a method, comprising: providing a plurality of sets of virtual reality video content, the sets representing respective three-dimensional virtual spaces within which a user can be immersed and being associated with respective three-dimensional portions of a real-world space such that, when rendered to a user device, there is a partial overlap between at least two virtual spaces defining one or more overlapping zones; determining the position of a user device within the real-world space; and rendering one or more of the virtual spaces, or representation(s) thereof, for display to the user device dependent on the determined position or movement within the real-world space.

A further aspect of the invention provides an apparatus, the apparatus having at least one processor and at least one memory having computer-readable code stored thereon which when executed controls the at least one processor: to provide a plurality of sets of virtual reality video content, the sets representing respective three-dimensional virtual spaces within which a user can be immersed and being associated with respective three-dimensional portions of a real-world space such that, when rendered to a user device, there is a partial overlap between at least two virtual spaces defining one or more overlapping zones; to determine the position of a user device within the real-world space; and to render one or more of the virtual spaces, or representation(s) thereof, for display to the user device dependent on the determined position or movement within the real-world space.

BRIEF DESCRIPTION OF THE DRAWINGS

The invention will now be described, by way of non-limiting example, with reference to the accompanying drawings, in which:

FIG. 1 is a perspective view of a VR display system, useful for understanding the invention;

FIG. 2 is a block diagram of a computer network including the FIG. 1 VR display system, according to example embodiments of the invention;

FIGS. 13a and 13b are respective plan and front views of selectable virtual world representations when rendered on respective walls of the real-world space;

DETAILED DESCRIPTION OF PREFERRED EMBODIMENTS

Figure 3:
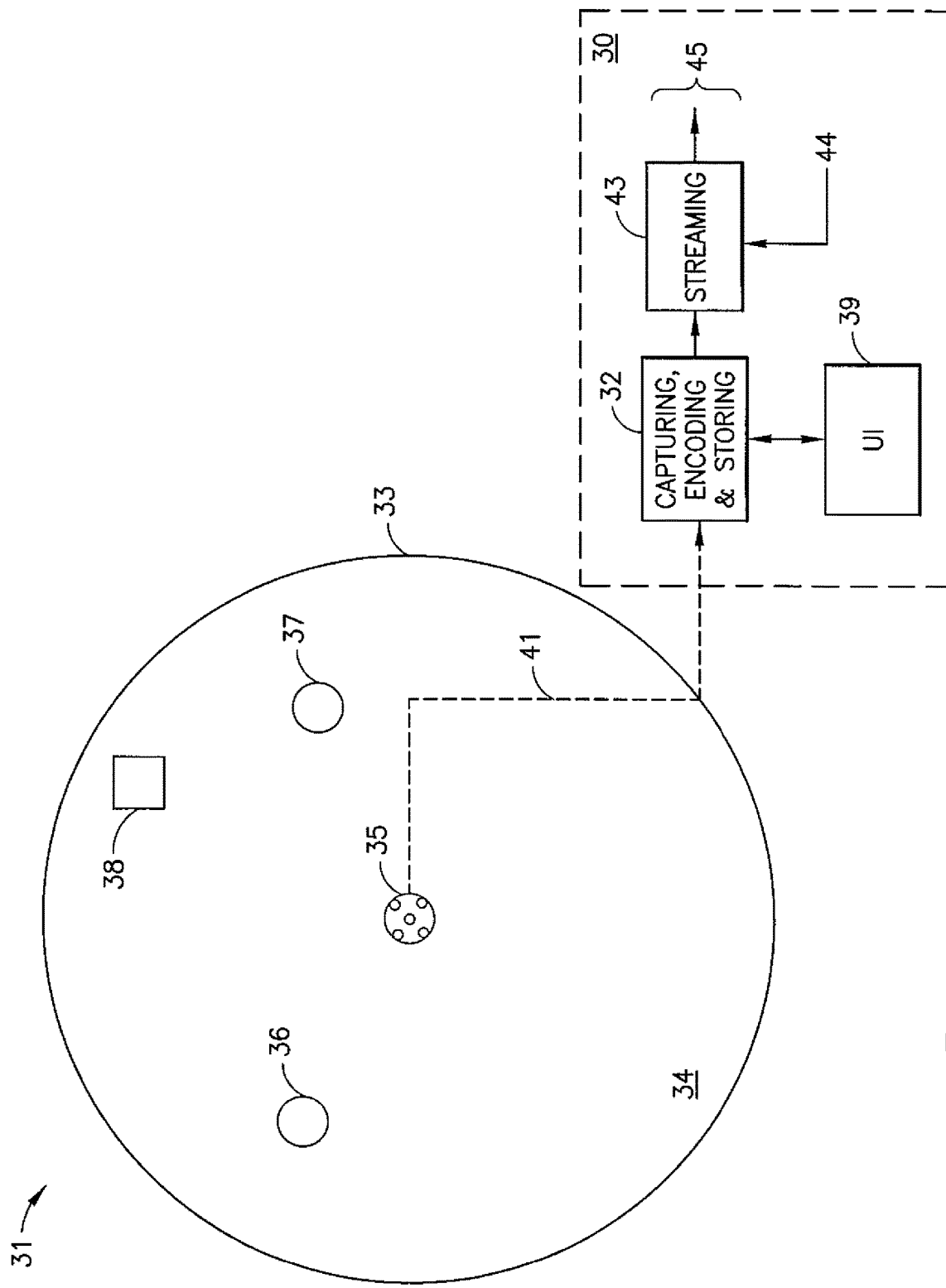
FIG. 3 is a schematic diagram of an example, conventional VR capture scenario, which is useful for understanding background.

Example embodiments herein relate to virtual reality (VR) and in particular to the provision of volumetric 3D spaces or worlds to one or more users using a user device, such as a VR display system. However, the methods and systems described herein are not limited as such, and can be used in any VR application.

More particularly, example embodiments relate to methods and systems for providing a plurality of VR worlds for display to a VR user device whereby a user can browse and select one or more VR worlds for rendering, even when consuming the content within a limited real-world area, e.g. a modest-sized room bounded by walls or other upright surfaces.

The VR worlds are represented by VR content data. In some example embodiments, the VR content data may be stored remotely from the one or more users, and streamed to users over a network, e.g. an IP network such as the Internet. In some example embodiments, the VR content data may be stored local to the one or more users on a memory device, such as a hard disk drive (HDD) or removable media such as a CD-ROM, DVD or memory stick. In some example embodiments, the VR content data may be stored on a cloud-based system.

In example embodiments described herein, it is assumed that the VR content data is stored remotely from one or more users, e.g. at a content server, and streamed over an IP network to one or more users. The data stream of VR content data may represent one or more VR spaces or worlds for immersive output through the display system. In some example embodiments, audio may also be provided, which may be spatial audio.

FIG. 1 is a schematic illustration of a VR display system 1 which represents user-end equipment. The VR system 1 includes a user device in the form of a VR headset 20, for displaying visual data for a VR space, and a VR media player 10 for rendering visual data on the VR headset 20. In some example embodiments, a separate user control (not shown) may be associated with the VR display system 1, e.g. a hand-held controller.

In the context of this specification, a virtual space or world is any computer-generated version of a space, for example a captured real world space, in which a user can be immersed. In some example embodiments, the virtual space may be entirely computer-generated, i.e. not captured. The VR headset 20 may be of any suitable type. The VR headset 20 may be configured to provide VR video and audio content data to a user. As such, the user may be immersed in virtual space.

The VR headset 20 receives the VR content data from a VR media player 10. The VR media player 10 may be part of a separate device which is connected to the VR headset 20 by a wired or wireless connection. For example, the VR media player 10 may include a games console, or a PC configured to communicate visual data to the VR headset 20.

Alternatively, the VR media player 10 may form part of the VR headset 20.

Here, the VR media player 10 may comprise a mobile phone, smartphone or tablet computer configured to play content through its display. For example, the VR media player 10 may be a touchscreen device having a large display over a major surface of the device, through which video content can be displayed. The VR media player 10 may be inserted into a holder of a VR headset 20. With such VR headsets 20, a smart phone or tablet computer may display visual data which is provided to a user's eyes via respective lenses in the VR headset 20. The VR display system 1 may also include hardware configured to convert the device to operate as part of VR display system 1. Alternatively, the VR media player 10 may be integrated into the VR headset 20. The YR media player 10 may be implemented in software. In some example embodiments, a device comprising VR media player software is referred to as the VR media player 10.

The VR display system 1 may include means for determining the spatial position of the user and/or orientation of the user's head. This may be by means of determining the spatial position and/or orientation of the VR headset 20. Over successive time frames, a measure of movement may therefore be calculated and stored. Such means may comprise part of the VR media player 10. Alternatively, the means may comprise part of the YR headset 20. For example, the VR headset 20 may incorporate motion tracking sensors which may include one or more of gyroscopes, accelerometers and structured light systems. These sensors generate position data from which a current visual field-of-view (FOV) is determined and updated as the user, and so the VR headset 20, changes position and/or orientation. The VR headset 20 will typically comprise two digital screens for displaying stereoscopic video images of the virtual world in front of respective eyes of the user, and also two speakers for delivering audio, if provided from the VR media player 10. The example embodiments herein, which primarily relate to the delivery of VR content, are not limited to a particular type of VR headset 20.

In some example embodiments, the VR display system 1 may determine the spatial position and/or orientation of the user's head using the above-mentioned 6DoF method. As shown in FIG. 1, these include measurements of pitch 22, roll 23 and yaw 24 and also translational movement in Euclidean space along side-to-side, front-to-back and up-and-down axes 25, 26, 27.

The VR display system 1 may be configured to display VR content data to the VR headset 20 based on spatial position and/or the orientation of the VR headset. A detected change in spatial position and/or orientation, i.e. a form of movement, may result in a corresponding change in the visual data to reflect a position or orientation transformation of the user with reference to the space into which the visual data is projected. This allows VR content data to be consumed with the user experiencing a 3D VR environment.

In the context of volumetric VR spaces or worlds, this means that the user's position can be detected relative to content provided within the volumetric VR content, e.g. so that the user can move freely within a given VR space or world, around individual objects or groups of objects, and can view the objects from different angles depending on the rotation of their head. In example embodiments to be described later on, the user may also view and explore a plurality of different VR spaces or worlds and move from one VR space or world to another one.

Audio data may also be provided to headphones provided as part of the VR headset 20. The audio data may represent spatial audio source content. Spatial audio may refer to directional rendering of audio in the VR space or world such that a detected change in the user's spatial position or in the orientation of their head may result in a corresponding change in the spatial audio rendering to reflect a transformation with reference to the space in which the spatial audio data is rendered.

The angular extent of the environment observable through the VR headset 20 is called the visual field of view (FOV). The actual FOV observed by a user depends on the inter-pupillary distance and on the distance between the lenses of the VR headset 20 and the user's eyes, but the FOV can be considered to be approximately the same for all users of a given display device when the VR headset is being worn by the user.

Referring to FIG. 2, a remote content provider 30 may store and transmit streaming VR content data which, in the context of example embodiments, is volumetric VR content data for output to the VR headset 20. Responsive to receive or download requests sent by the VR media player 10, the content provider 30 streams the VR data over a data network 40, which may be any network, for example an IP network such as the Internet.

The remote content provider 30 may or may not be the location or system where the VR video is captured, created and/or processed.

For illustration purposes, we may assume that the content provider 30 also captures, encodes and stores the VR content, as well as streaming it responsive to signals from the VR display system 1.

Referring to FIG. 3, an overview of a conventional VR capture scenario 31 is shown. The VR capture scenario 31 is shown together with a capturing, encoding and storing module 32 and an associated user interface 39. FIG. 3 shows in plan-view a real world space 33 which may be for example a concert hall or other music venue. The capturing, encoding and storing module 32 is applicable to any real world space, however. A VR capture device 35 for video and possibly spatial audio capture may be supported on a floor 34 of the real-world space 33 in front of one or more objects 36, 37, 38. The objects 36, 37, 38 may be static objects or may move over time. One or more of the objects 36, 37, 38 may be a person. One or more of the objects 36, 37, 38 may generate audio, e.g. a singer, a performer or musical instrument.

The position of the VR capture device 35 may be known, e.g. through predetermined positional data or signals derived from a positioning tag on the VR capture device. The VR capture device 35 in this example may comprise multiple cameras distributed around a body of the VR capture device and a microphone array configured to provide spatial audio capture.

One or more of the objects 36, 37, 38 may carry a positioning tag. A positioning tag may be any module capable of indicating through data its respective spatial position to the capturing, encoding and storing module 32. For example a positioning tag may be a high accuracy indoor positioning (HAIP) tag which works in association with one or more HAIP locators within the space 33. HAIP systems use Bluetooth Low Energy (BLE) communication between the tags and the one or more locators. For example, there may be four HAIP locators mounted on, or placed relative to, the VR capture device 35. A respective HAIP locator may be to the front, left, back and right of the VR capture device 35. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The capturing, encoding and storing module 32 is a processing system, possibly having an associated user interface (UI) 39 which may be used by an engineer or mixer to monitor and/or modify any aspect of the captured video and/or audio. As shown in FIG. 3, the capturing, encoding and storing module 32 receives as input from the VR capture device 35 spatial video data (and possibly audio data) and positioning data, through a signal line 41. Alternatively, the positioning data may be received from a HAIP locator. The capturing, encoding and storing module 32 may also receive as input from one or more of the objects 36, 37, 38 audio data and positioning data from respective positioning tags through separate signal lines. The capturing, encoding and storing module 32 generates and stores the VR video and audio data for output to a user device 19, such as the VR system 1 shown in FIGS. 1 and 2, via a signal line 45.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the Nokia OZO® VR camera, if used for the VR capture device 35. The microphone signals can then be rendered to loudspeaker or binaural format for playback.

Associated with the capturing, encoding and storing module 32 is a streaming system 43, for example a streaming server. The streaming system 43 may be an entirely separate system from the capturing, encoding and storing module 32. Signal line 44 indicates an input received over the network 40 from the VR system 1. The VR system 1 indicates through such signalling the data to be streamed dependent on position and/or orientation of the VR display device 20. Reference numeral 45 indicates the signal line to the network 40.

Figure 4:
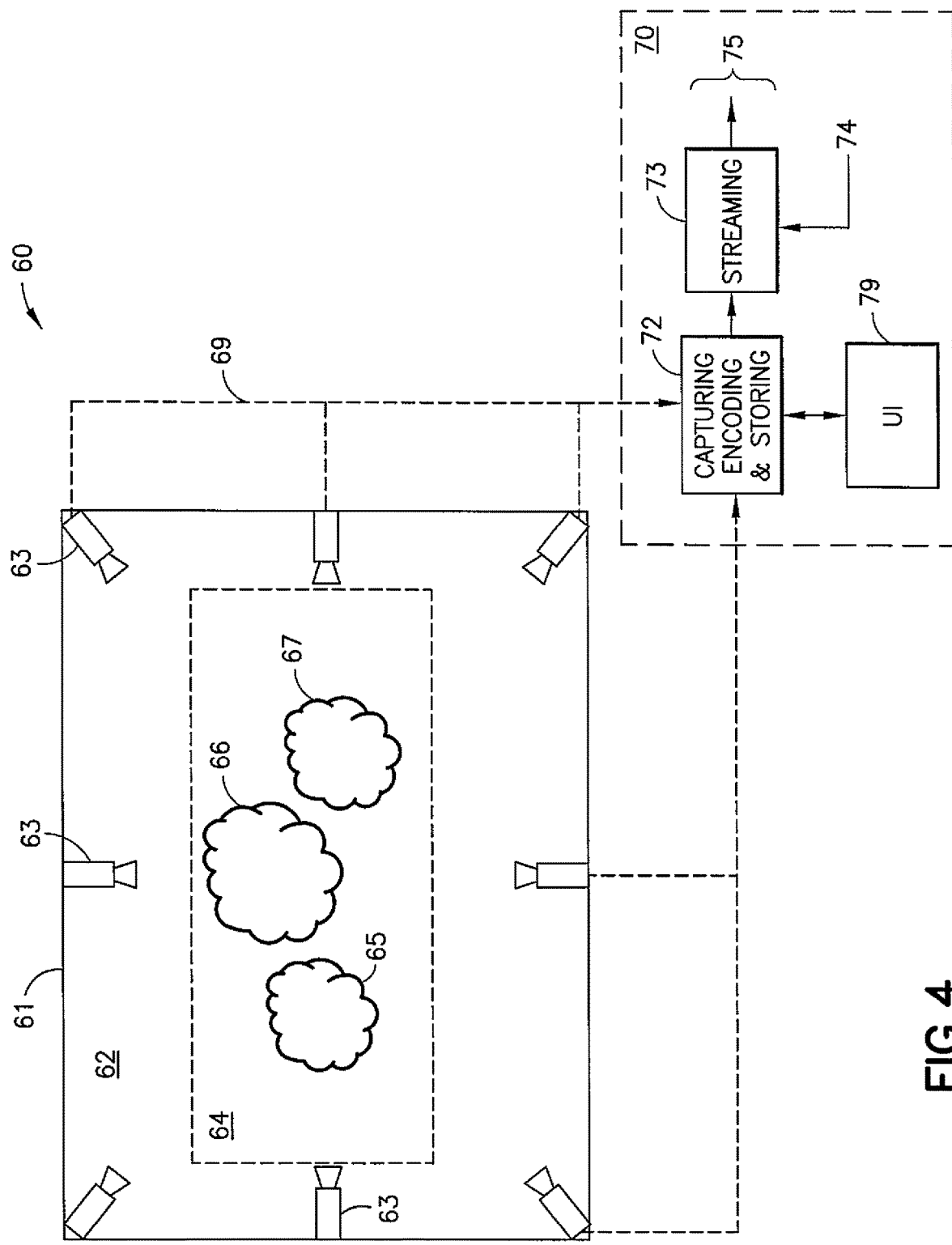
FIG. 4 is a schematic diagram of a further VR capture scenario for capturing volumetric VR content, in accordance with example embodiments of the invention.

Referring to FIG. 4, an overview of a volumetric VR capture scenario 60 is shown according to some example embodiments. The capture scenario 60 is shown together with processing modules provided at a content provider system 70, including a capturing, encoding and storing module 72 and an associated user interface 79, which is optional. FIG. 4 shows in plan-view a real world space 61 which may be for example a garden comprising three trees 65, 66, 67. The capturing, encoding and storing module 72 is applicable to any real world space, however. In this case, multiple cameras 63 are positioned around the real-world space 61 (and may be positioned at different heights) so as to capture video from a focal capture zone 64 from all sides in order to generate a full three-dimensional representation of the objects 65, 66, 67 within the focal capture zone. It will be appreciated that a greater or fewer number of cameras 63 may be provided in practice. In some example embodiments, one or more microphones (not shown) may also be provided for capturing spatial audio. The dimensions of the focal capture zone 64 may be larger or smaller.

Similar to the FIG. 3 scenario, the capturing, encoding and storing module 72 is a processing system which may have an associated user interface (UI) 79 which may be used by an engineer or mixer to monitor and/or modify any aspect of the captured video and/or audio. As shown in FIG. 4, the capturing, encoding and storing module 72 receives as input from the cameras 63 the video data. The video data may be received using signal line(s) 69, only a subset of which are shown, and/or by wireless means. The respective position of each camera 63 may be predetermined, or, in some example embodiments, each camera may have an associated positioning tag (e.g. a HAIP positioning tag) used to indicate the position of each camera in the real-world space 61. If audio data is provided, the capturing, encoding and storing module 72 may also receive as input audio data using wired or wireless means. The capturing, encoding and storing module 72 processes the received video data, and possibly audio data, to generate using known techniques a volumetric three-dimensional world representing the focal capture zone 64. This captured 'virtual world' is stored for output to a user device, such as the VR system 1 via signal line 75.

Similar to the FIG. 3 scenario, if audio is captured, the audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input. The microphone signals can then be rendered to loudspeaker or binaural format for playback.

Similar to the FIG. 3 scenario, associated with the capturing, encoding and storing module 72 is a streaming system 73, for example a streaming server. The streaming system 73 may be an entirely separate system from the capturing, encoding and storing module 72. Signal line 74 indicates an input received over the network 40 from the VR system 1. As will be explained, the VR system 1 indicates through such signalling video data to be streamed dependent on position and/or orientation of the VR headset 20 within a corresponding VR space. Reference numeral 75 indicates the signal line to the network 40.

In example embodiments herein, the capturing, encoding and storing module 72 stores a plurality of virtual worlds, each of which may represent different volumetric VR content.

Figure 5:
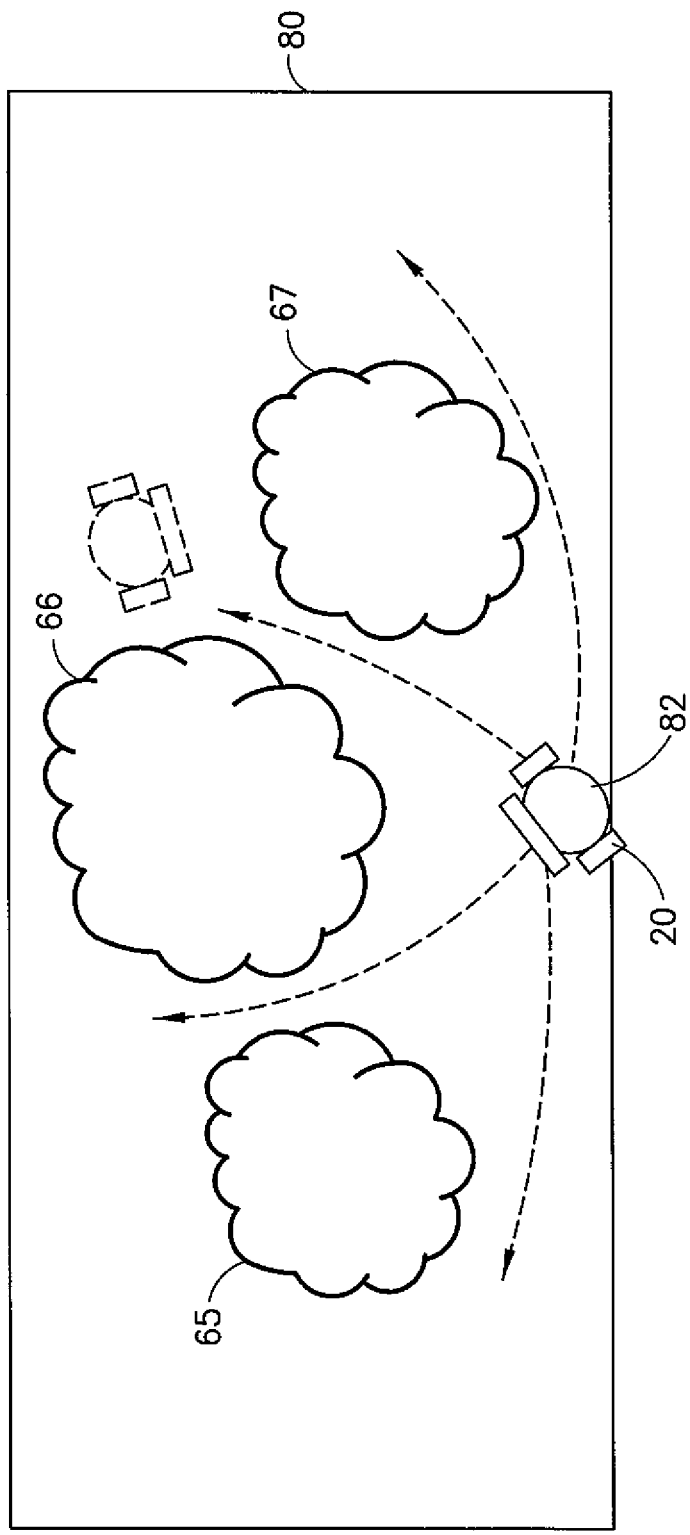
FIG. 5 is a top plan view of a first virtual world, and overlaid first and second positions of a user immersed in the first virtual world.

FIG. 5 shows in top-plan view a first example virtual world 80, captured using, for example, the FIG. 4 scenario 60, although other methods of generating the virtual world may be used. The virtual world 80 comprises a three-dimensional, volumetric representation of a garden comprising the first, second and third trees 65, 66, 67. Also shown is the relative position of a user 82 wearing the VR headset 20 when in a first position and in a subsequent, second position indicated by broken lines. The broken arrows indicate that the user 82 may move freely around the trees 65, 66, 67 and view them from all directions and orientations.

Figure 6A:
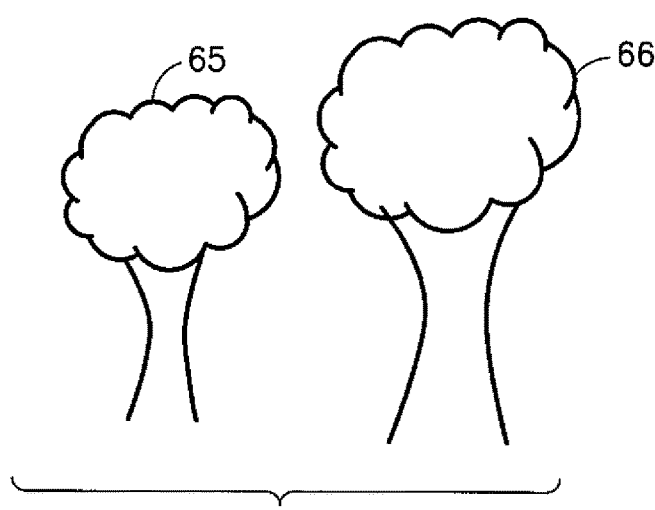
FIGS. 6a and 6b are user viewpoints of the FIG. 5 first virtual world at the respective first and second positions.
Figure 6B:
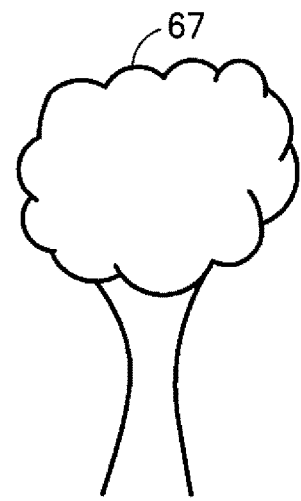

FIG. 6a is a graphical view of VR content data which is rendered to the VR display headset 20 when the user 82 is in the first position. Particularly, the three-dimensional image that is rendered to the VR headset 20 will be the first and second trees 65, 66. FIG. 6b is a graphical view of what is rendered to the VR headset 20 when the user 82 is in the second position, having rotated their body towards the rear of the third tree 67.

Figure 7:
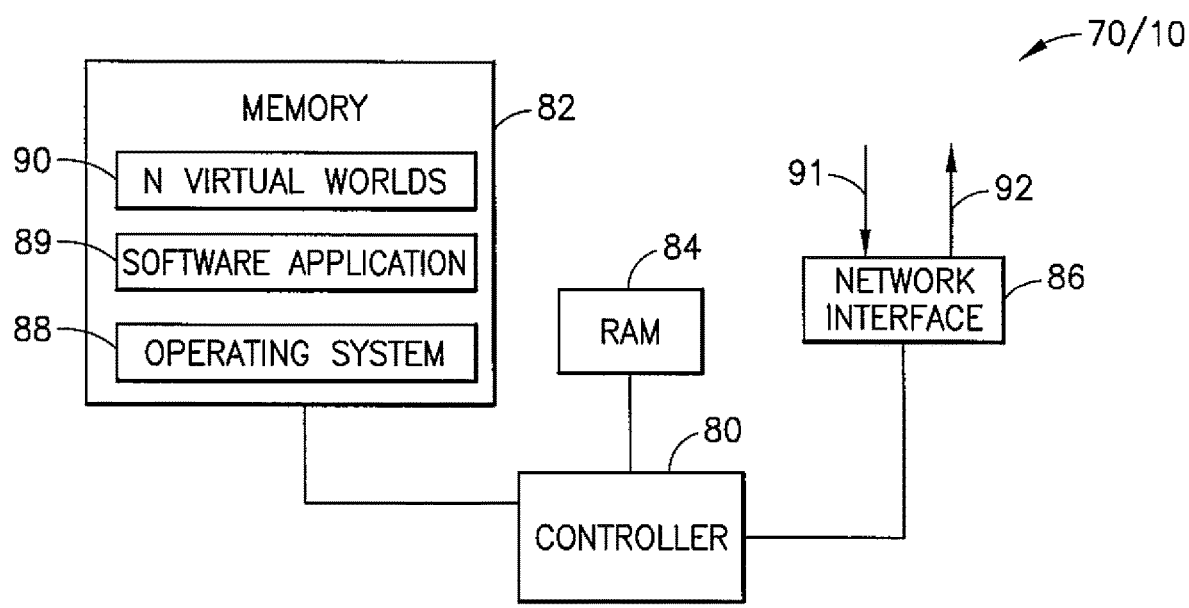
FIG. 7 is a schematic diagram of components of a content provider system shown in FIG. 4.

FIG. 7 is a schematic diagram of components of the content provider system 70. The content provider system 70 may have a controller 80, a memory 82 and RAM 84. The content provider system 70 may comprise a network interface 86 for connection to the network 40, e.g. a modem which may be wired or wireless. The content provider system 70 may also receive positional signals from the VR headset 20 over signal line 74 and outputs streaming content for one or more virtual worlds over signal line 75. The positional signals may be indicative of user position/orientation. The output signals to the display device 10 will be the VR content data. The controller 80 is connected to each of the other components in order to control operation thereof.

The memory 82 may be a non-volatile memory such as read only memory (ROM), a hard disk drive (HDD) or a solid state drive (SSD). The memory 82 stores, amongst other things, an operating system 88 and may store software applications 89. The RAM 84 is used by the controller 80 for the temporary storage of data. The operating system 88 may contain code which, when executed by the controller 80 in conjunction with the RAM 84, controls operation of each of the hardware components. Additionally, the memory 82 may stores VR content data for a plurality N of virtual worlds 90. Alternatively, the VR content data may be stored remotely.

The controller 80 may take any suitable form. For instance, it may be a microcontroller, plural microcontrollers, a processor, or plural processors.

In some example embodiments, the content provider system 70 may also be associated with external software applications or VR content data not stored on the memory 82. These may be applications or VR content data stored on a remote server device and may run partly or exclusively on the remote server device. These applications or VR content data may be termed cloud-hosted applications or data. The content provider system 70 may be in communication with the remote server device in order to utilize the software application or data stored there.

In some example embodiments, the components shown in FIG. 7 may be provided at the media player 10 (without the need for the network interface 86).

One software application 89 provided on the memory 82 is for controlling what is transmitted and rendered to the VR system 1. In some example embodiments, the software application 89 may render a user interface that permits selection of representations of a plurality of the N virtual worlds 90, for example to expand selected virtual worlds 90 into a current real-world space. In some example embodiments, two or more virtual worlds 90 may be rendered in respective areas or volumes of the real-world space, such that they at least partially overlap. The region of overlap may be termed an overlapping zone. In some example embodiments, the overlapping zone(s) may be rendered such that VR content from both zones remains visible to the user, for example when the user is outside either virtual world. In some example embodiments, the software application 89 may control transitioning between different ones of the virtual worlds 90.

In example embodiments herein, each of the N virtual worlds 90 is associated with a respective portion of a real-world space in which the VR content data is to be consumed. The real-world space will typically be a room, for example in a home, office or school, having a finite floor area and bounded by one or more walls or other upright surfaces.

Figure 8A:
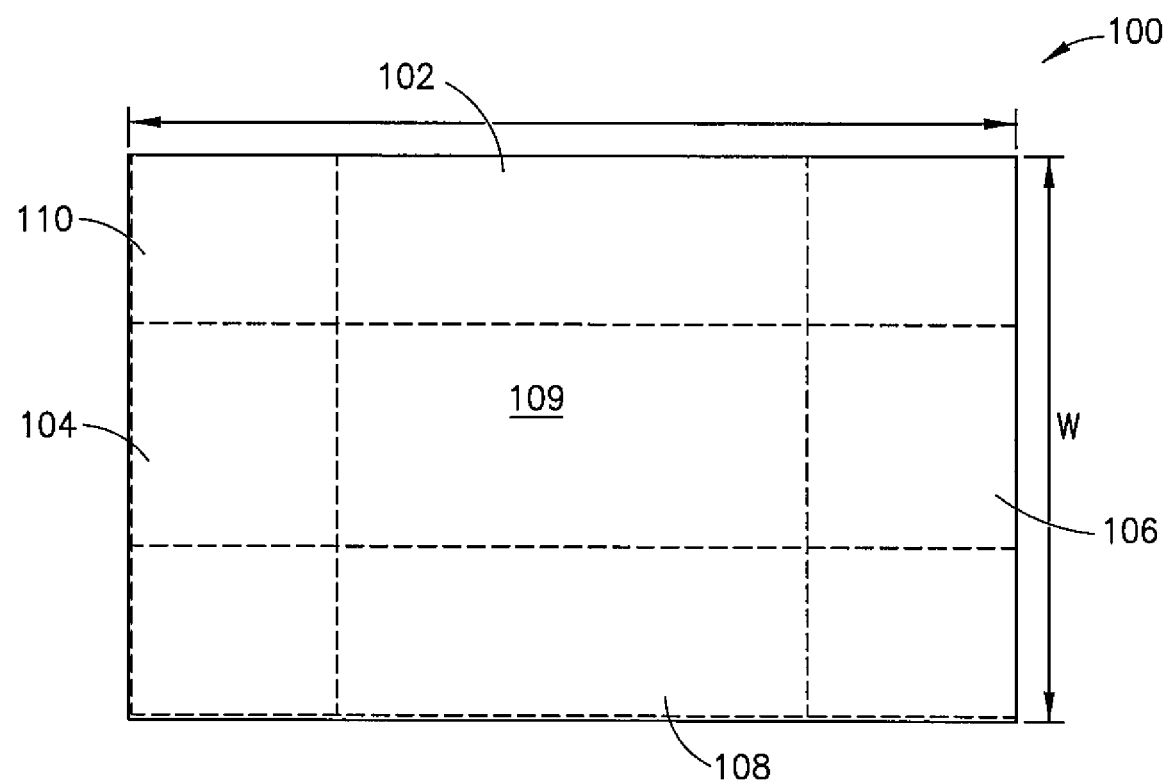
FIGS. 8a and 8b are respective plan and perspective views of a real-world space in which a user may consume one or more virtual worlds.
Figure 8B:
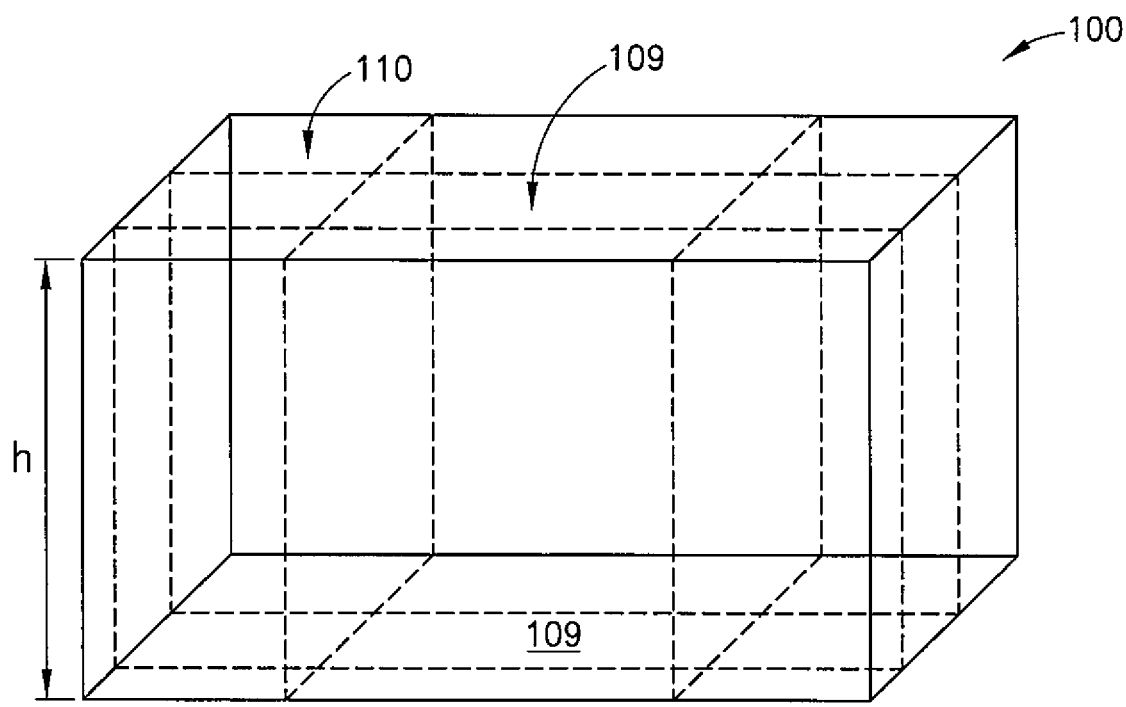

Referring to FIGS. 8a and 8b, respective plan and perspective views of an example real-world space 100 are shown. The real-world space 100 has a known length 1, width w and height h. The floor area and internal volume of the real-world space 100 is therefore also known, defining the space within which the user may consume selected ones of the N virtual worlds 90. The dimensions of the real-world space 100 may be predefined, measured, estimated and/or manually entered into the software application 89 using an appropriate user interface. In some example embodiments, the real-world space 100 may be scanned by a camera or depth-sensor (e.g. a LiDAR system) to estimate the dimensions of said space.

For example, first, second, third and fourth virtual worlds may be respectively associated with first, second, third and fourth portions 102, 104, 106, 108 of the real-world space 100. It will be appreciated that any number and/or arrangement of portions may be provided. An overlapping zone 110 is indicated at the overlapping region of the first and second virtual worlds, which are adjacent. In the shown arrangement, there are four such overlapping zones. A central region 109 indicates a portion of the real-world space having no associated virtual world.

The association between virtual worlds and respective portions 102, 104, 106, 108 of the real-world 100 space may be defined using any known means. For example, the association may be performed manually or automatically. For example, a user interface may be provided which shows a graphical representation of the real-world space 100 and enables a user to select a particular virtual world and place it within the graphical representation, e.g. using drag-and-drop or other form of association.

Figure 9:
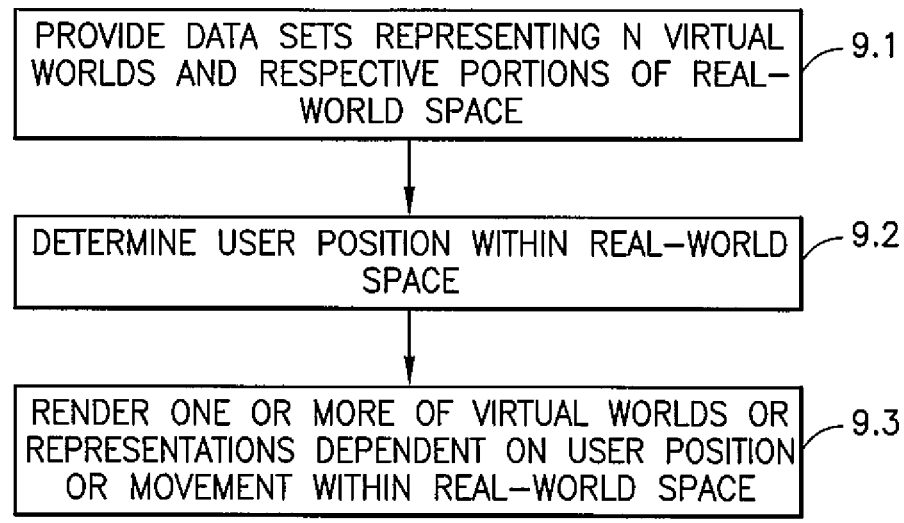
FIG. 9 is a flow diagram showing processing steps for rendering one or more virtual worlds to the FIG. 1 VR display dependent on user position or movement within a real-world space.

FIG. 9 is a flow diagram showing processing steps performed by the software application 89 in rendering one or more of the virtual worlds 90. A first step 9.1 comprises providing a plurality of data sets, each set representing a respective one of the N virtual worlds 90 and their associated portions of the real-world space 100. A second step 9.2 comprises determining a user position within the real-world space zoo. As mentioned previously, this may be performed using positional signals received from the VR headset 20. A third step 9.3 comprises rendering one or more of the N virtual worlds 90, or representations thereof, dependent on the user position or movement within the real-world space 100.

Figure 10A:
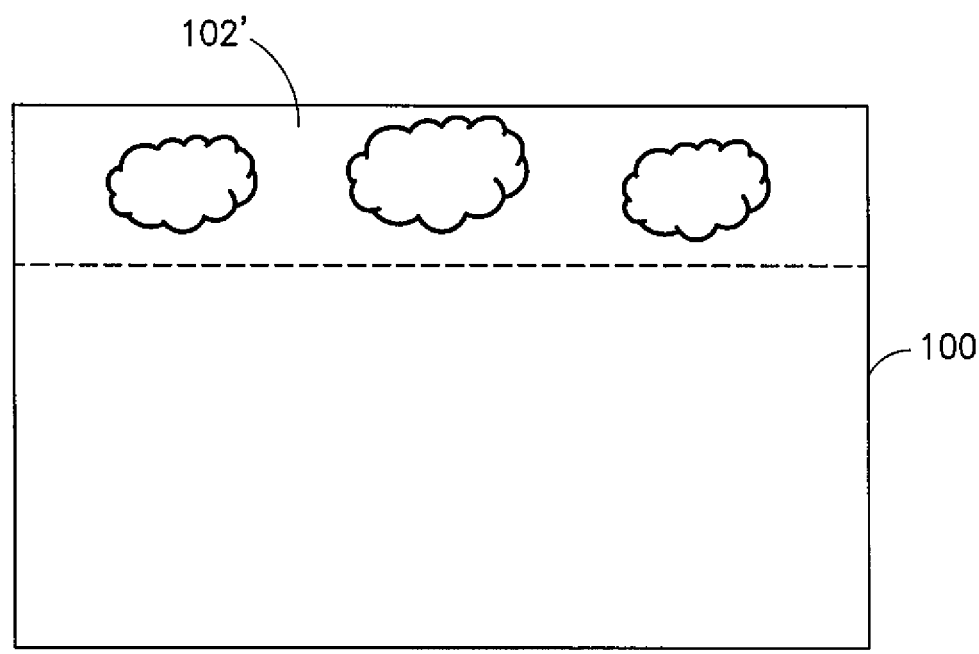
FIGS. 10a and 10b are respective plan and perspective views of the FIG. 5 first virtual world and its associated portion of the real-world space.
Figure 10B:
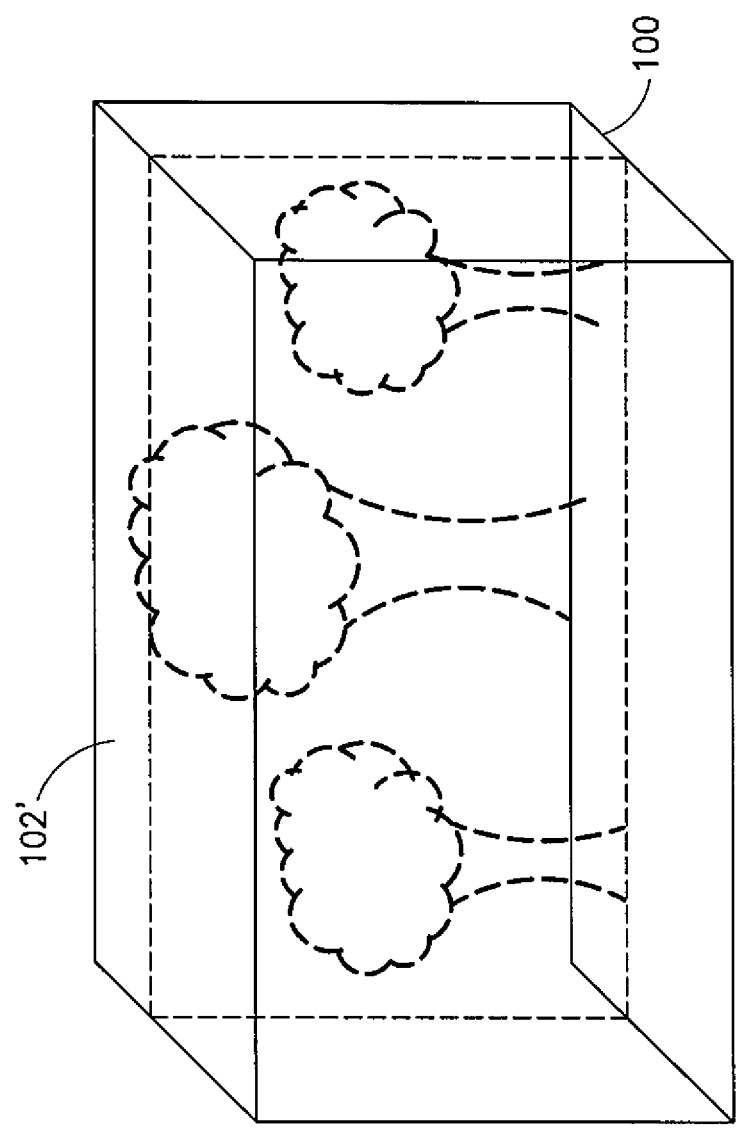

FIGS. 10a and 10b indicate a rendered first data set, representing a first one of the N virtual worlds go. In the shown example, the first virtual world 102' comprises the VR world captured in the FIG. 4 scenario. The first virtual world 102' is associated with the first portion 102 of the real-world space 100 and therefore occupies this part of said real-world space when rendered and viewed through the VR headset 20. Figure ma shows the top plan view of the first virtual world 102' and Figure rob the perspective view of the first virtual world.

Figure 11A:
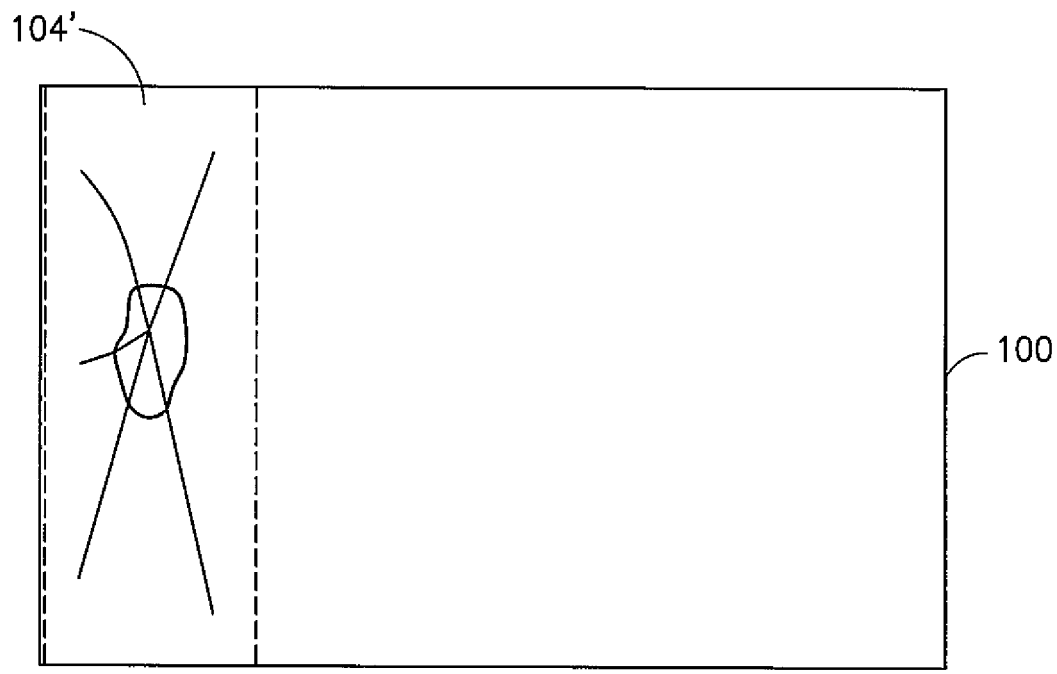
FIGS. 11a and 11b are respective plan and perspective views of a second virtual world and its associated portion of the real-world space.
Figure 11B:
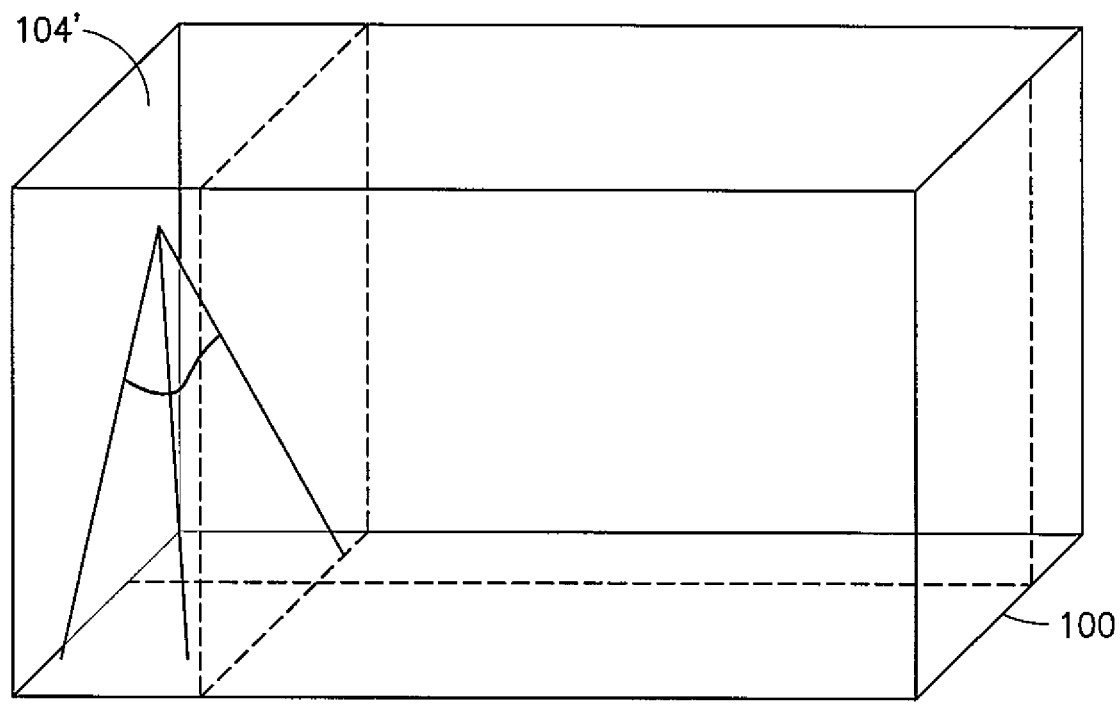

FIGS. 11*a* and 11*b* indicate a rendered second data set, representing a second virtual world 104'. In the shown example, the second virtual world 104' represents a mountain. The second virtual world 104' is associated with the second portion 104 of the real-world space 100 and therefore occupies this part of the real-world space when rendered and viewed through the VR headset 20. FIG. 11*a* shows the top plan view of the second virtual world 104' and Figure rib the perspective view of the first virtual world.

Figure 12:
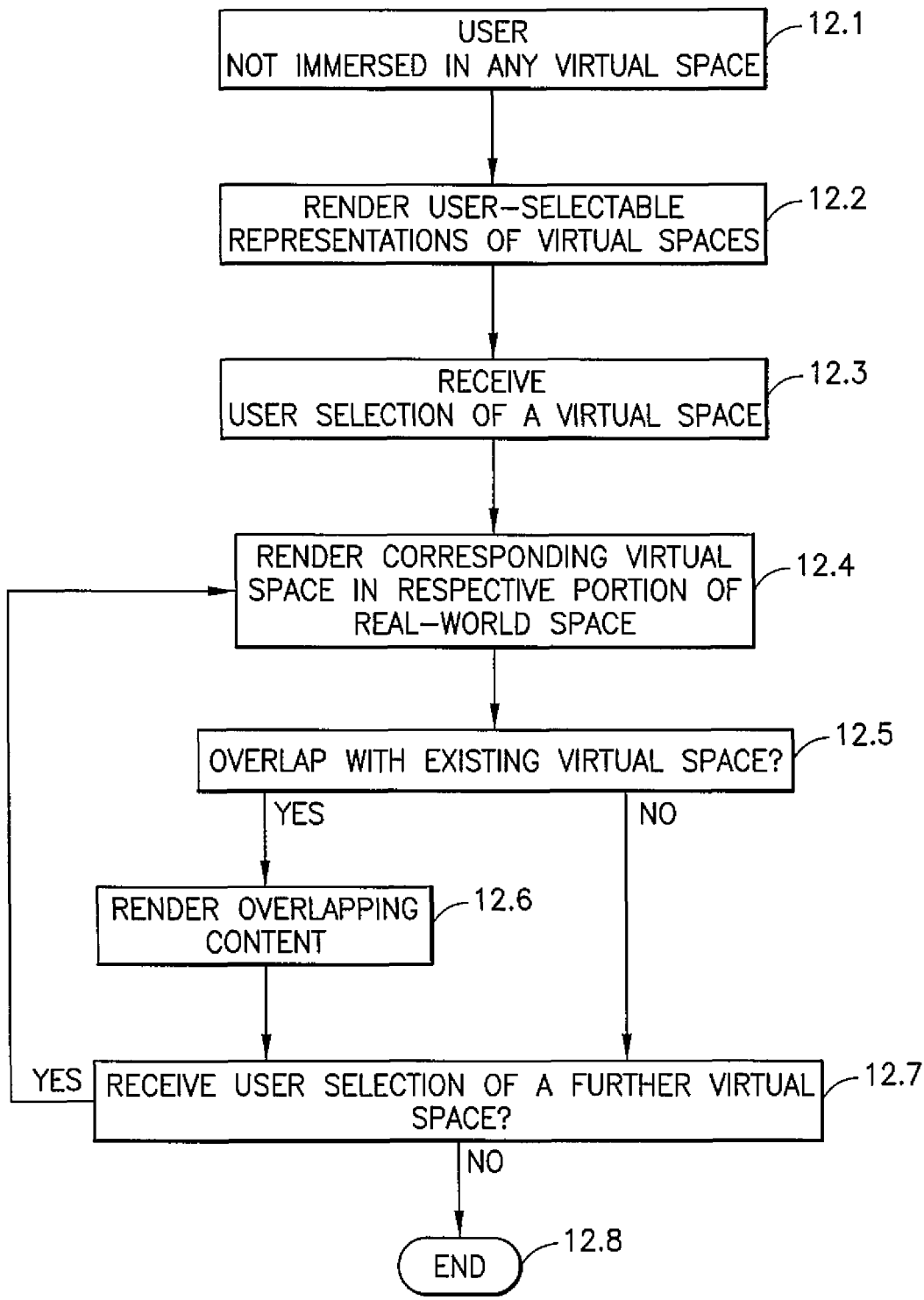
FIG. 12 is a flow diagram showing more detailed processing steps for rendering one or more virtual worlds to the FIG. 1 VR display based on a user selection.

FIG. 12 is a flow diagram showing processing steps performed by the software application 89 in performing step 9.3 referred to above. It should be appreciated that the order of the steps may change depending on where the user is currently located in the real-world space 100.

In this respect, the software application 89 determines what content data is output and rendered to the VR headset 20 based on one or more of (i) where the user is currently positioned in the real-world space 100, (ii) whether or not they are in an overlapping zone, and (iii) the part of the real-world space they were previously located in or transitioning from.

In a first step 12.1, if the user is positioned at a location not associated with one of the virtual worlds, for example the central region 109 shown in FIGS. 8*a* and 8*b*, then in a subsequent step 12.2, user-selectable representations of each virtual world may be rendered to the VR headset 20.

A representation may, for example, be a substantially two-dimensional image which visually indicates the nature of each respective virtual world. The image may be a static image, a video clip and/or comprise text, for example. The representation may be three-dimensional. The representation may provide a summary of the associated content. For example, the representation may be smaller in volume than its corresponding virtual world when fully-rendered so that it does not occupy the entire portion of its associated real-world space. This is to permit the user to clearly see all available worlds.

In a subsequent step 12.3, user selection of one of the virtual worlds is received. There are various ways in which a user may select a virtual world. Selection may be by means of a user gesture, for example a pointing, waving or pulling motion towards one of the representations. In other example embodiments, to be described later on, a graphical user interface may be rendered at or near the user's feet, permitting selection using foot gestures.

In a step 12.4, responsive to a user selection of one of the virtual worlds, said virtual world is rendered in its respective portion of the real-world space 100. For example, selection of the first virtual world 102' may cause it to expand from a substantially two-dimensional image or video clip into its associated portion of the real-world space.

In a step 12.5, it is determined if the rendered virtual world overlaps with an existing rendered virtual world. If it does, then in step 12.6 the visual content for each said virtual world is rendered in the relevant overlapping zone, i.e. one does not dominate or obscure the other. The process then moves to step 12.7 which determines if another virtual world has been selected.

If there is no overlap detected in step 12.5, then the process moves directly to step 12.7. If a further user selection is received in step 12.7, then the process may return to step 12.4 and the process repeats through the subsequent steps. If no further user selections are received in step 12.7, then the process may end in step 12.8.

Figure 13B:
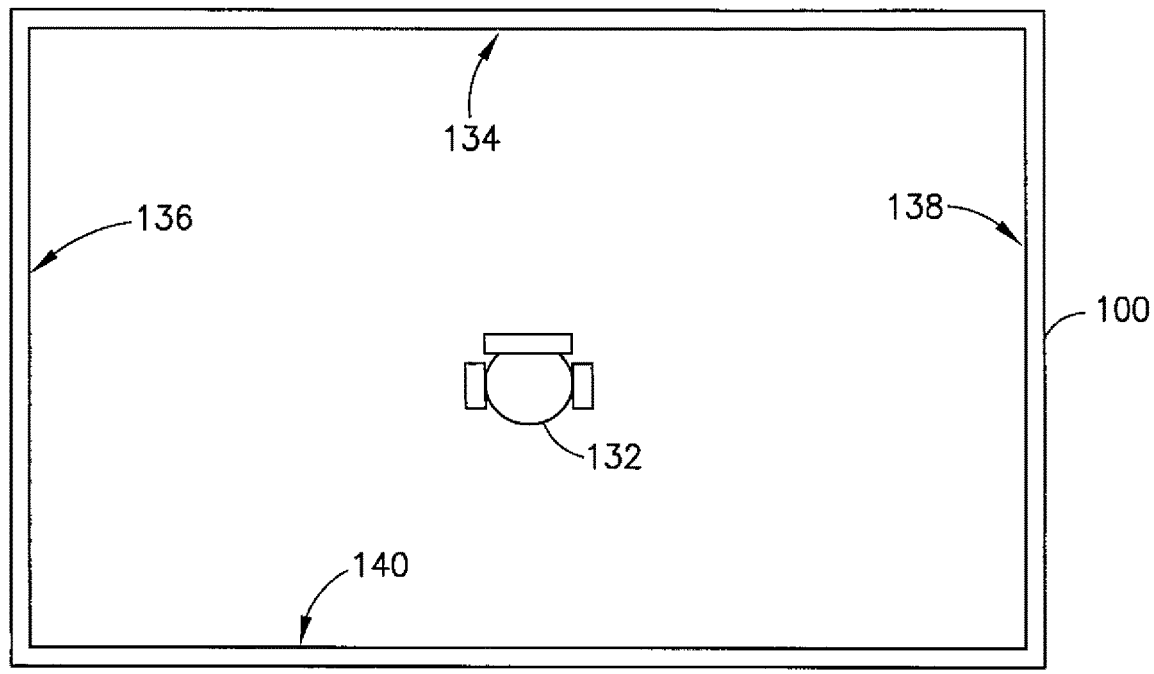
Figure 13B:
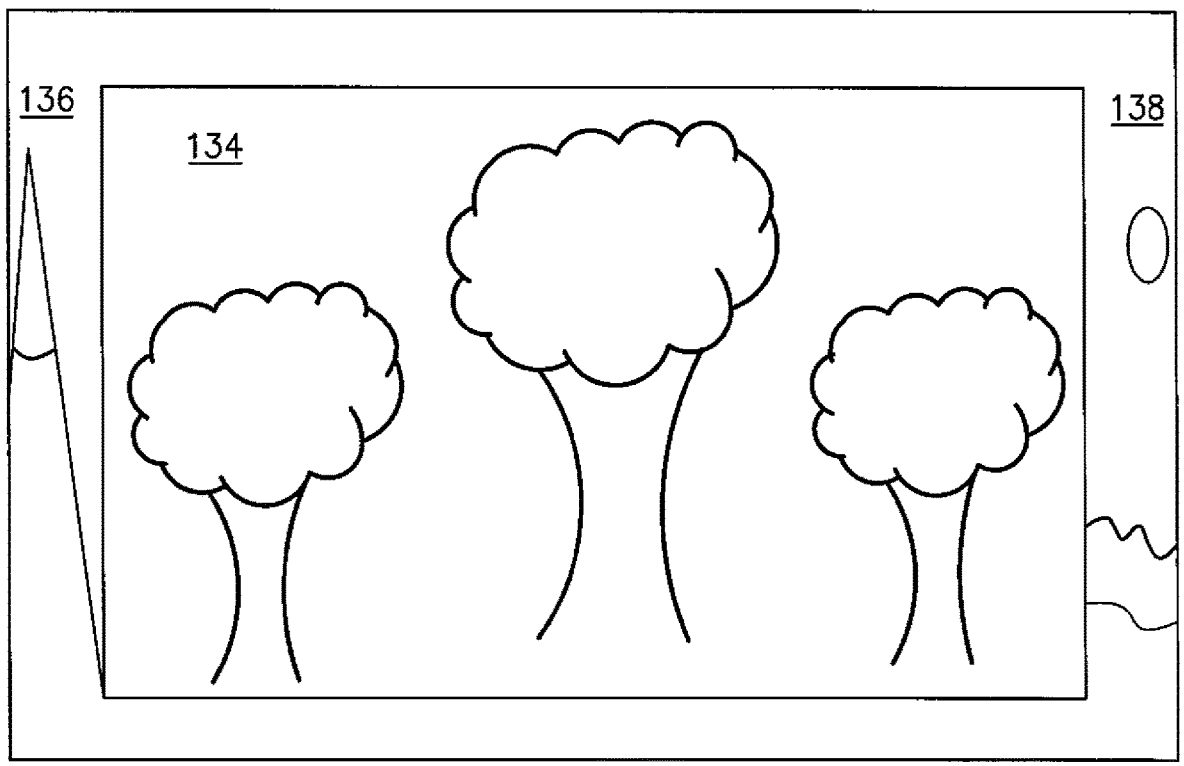
Figure 14A:
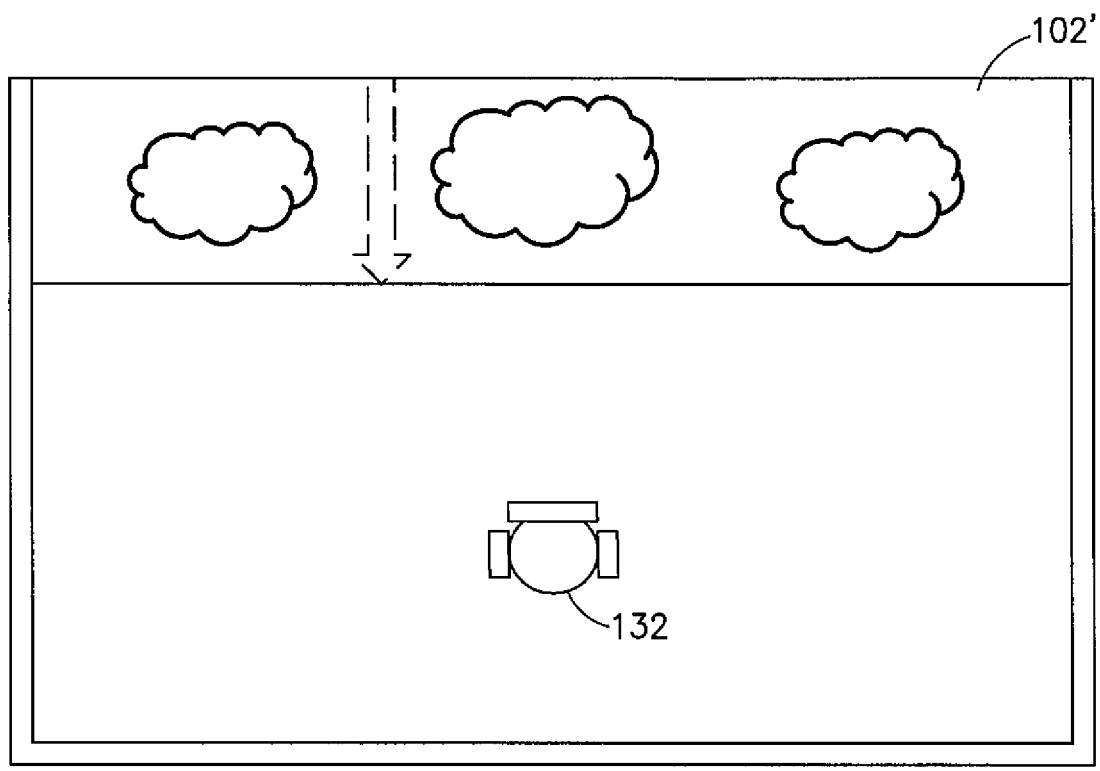
FIGS. 14a and 14b are top plan views of the real-world space with overlaid first and second virtual worlds, when selected by a user.

FIGS. 13 and 14 show graphical examples which are useful for understanding the FIG. 12 method. FIG. 13*a* shows the real-world space 100 in top plan view, with a user 132 wearing the VR display device 20 positioned within the central region 109. Graphical representations 134, 136, 138, 140 are associated with each of four virtual worlds, rendered on respective walls of the real-world space 100. This is understood better with reference to FIG. 13*b* which shows three such graphical representations 134, 136, 138 from the user's viewpoint. A first representation 134 is an image or video clip associated with the first virtual world 102', i.e. the trees captured in the FIG. 4 scenario. A second representation 136 is an image or video clip associated with the second virtual world 104', i.e. the mountain shown in Figure ii. A third representation 138 is an image or video clip associated with a third virtual world, which in this case is a beach scene. The fourth representation 140 cannot be seen in FIG. 13*b* because it is behind the user; however, it will be appreciated that the representation is available for viewing and selection should the user turn around.

It will be appreciated that multiple virtual worlds may be shown for selection notwithstanding the limited dimensions of the real-world space 100, requiring a relatively small amount of data and memory resources.

A user may select one or more of the first to fourth representations 134, 136, 138, 140 by means of a user gesture, for example a pointing, waving or pulling motion towards/away from one of the representations. In other example embodiments, a graphical user interface may be rendered at or near the user's feet permitting selection using foot gestures.

Referring to Figure ma, user selection of the first representation 134 is effective to cause the corresponding virtual world 102' to be fully rendered to occupy its associated portion 102 of real-world space 100. This may involve the virtual world 102' appearing to expand from its two-dimensional representation 134 to the fully-rendered version. In some example embodiments, the expansion may be animated so as to depict a gradual expansion. In some example embodiments, if the user selection gesture is a pulling gesture, this offers the effect of the user 'pulling' the relevant virtual world 102' from the wall, as indicated by the arrow.

Figure 14B:
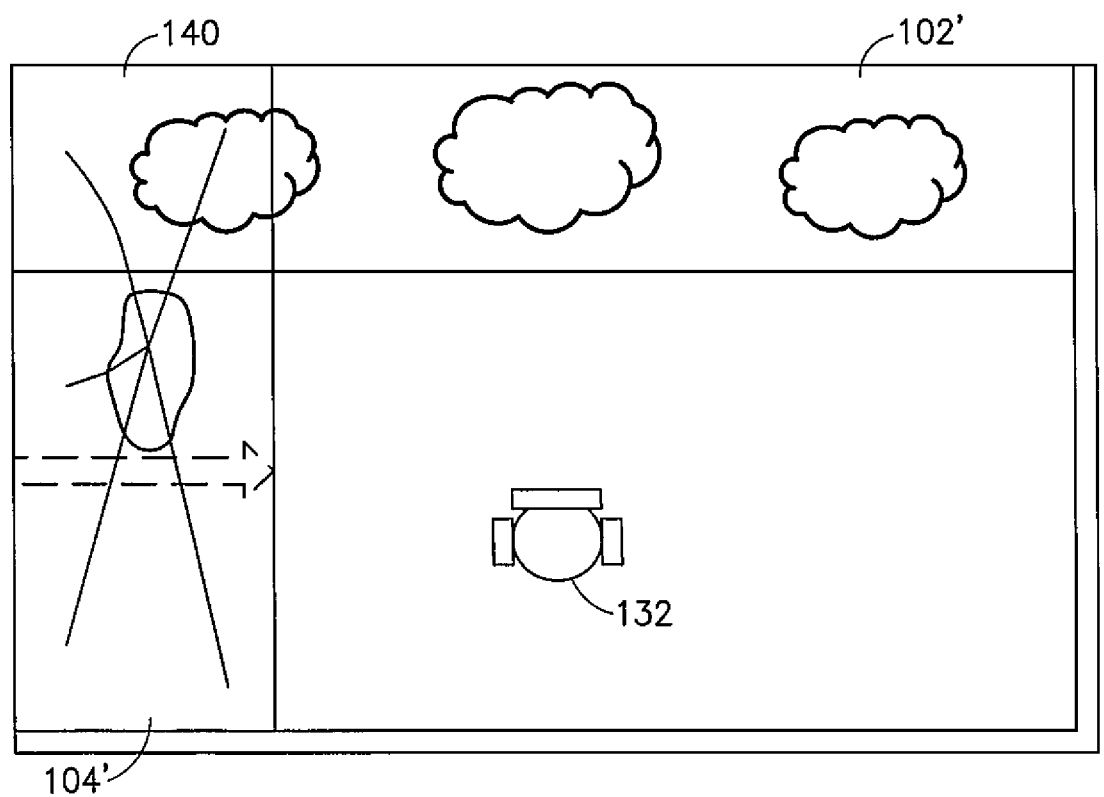

Referring to FIG. 14*b*, a subsequent user selection of the second representation 136 is effective to cause the corresponding second virtual world 104' to be fully rendered to occupy its associated portion 104 of the real-world space. Similarly, this may involve the virtual world 104' appearing to expand from its two-dimensional representation 136 to the fully-rendered version. In some example embodiments, the expansion may be animated. In some example embodiments, if the user selection gesture is a pulling gesture, this offers the effect of the user 'pulling' the relevant virtual world from the wall, as indicated by the arrow.

Still referring to FIG. 14*b*, a result of selecting both the first and second representations 134, 136 is that the first and second virtual worlds 102', 104' partially overlap at overlap zone 140 when seen from the user's viewpoint. In other words, when the user is looking towards the overlapping zone 140, the user sees both sets of virtual content.

In some example embodiments, the overlapping virtual content may be shown in semi-transparent form to aid visibility.

It will be appreciated therefore that two or more virtual worlds may be selected and rendered in a limited real-world space for the user to explore.

Figure 15:
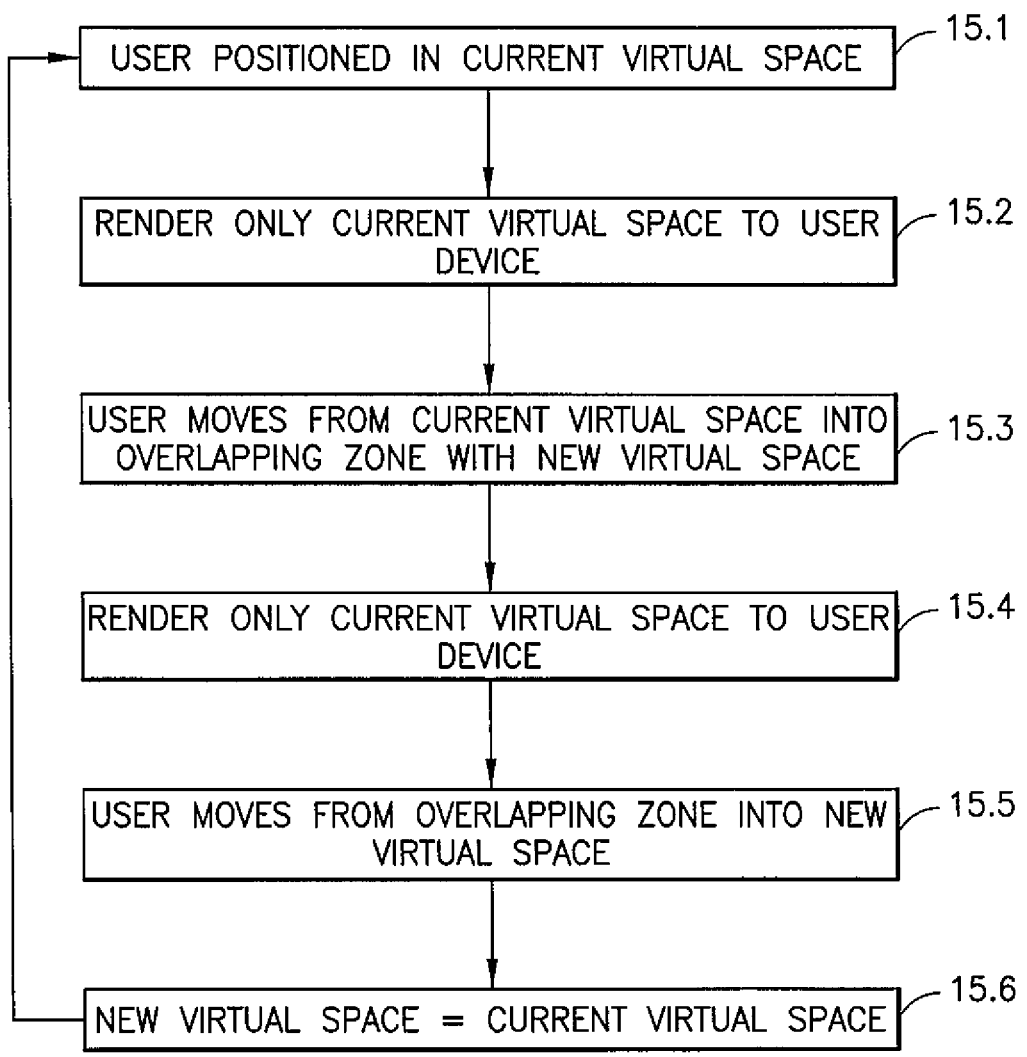
FIG. 15 is a flow diagram showing processing steps for rendering one or more virtual worlds to the FIG. 1 VR display based on a user moving from one virtual world to another virtual world.

FIG. 15 is a flow diagram showing processing steps performed by the software application 89 in performing step 9.3 when the user is positioned at a location corresponding to a rendered virtual space, e.g. one of the virtual spaces 102', 104' shown in FIG. 14b.

A first step 15.1 comprises identifying that the user is within a current virtual world. A subsequent step 15.2 comprises rendering only content data for the current virtual world to the VR headset 20. In a subsequent step 15.3, if the user moves from the current virtual world into an overlapping zone with a different virtual world, then in step 15.4 the current virtual world continues to be rendered (with no content from the different virtual world.) In a subsequent step 15.5, if the user moves from the overlapping zone into the different virtual world, then the latter becomes the current virtual world (step 15.6) and the process repeats from step 15.2.

FIGS. 16a-16d provide graphical examples which are useful for understanding the FIG. 15 method. It is assumed that the first and second virtual worlds 102', 104' have been selected, as previously described with reference to FIG. 14b.

Figure 16A:
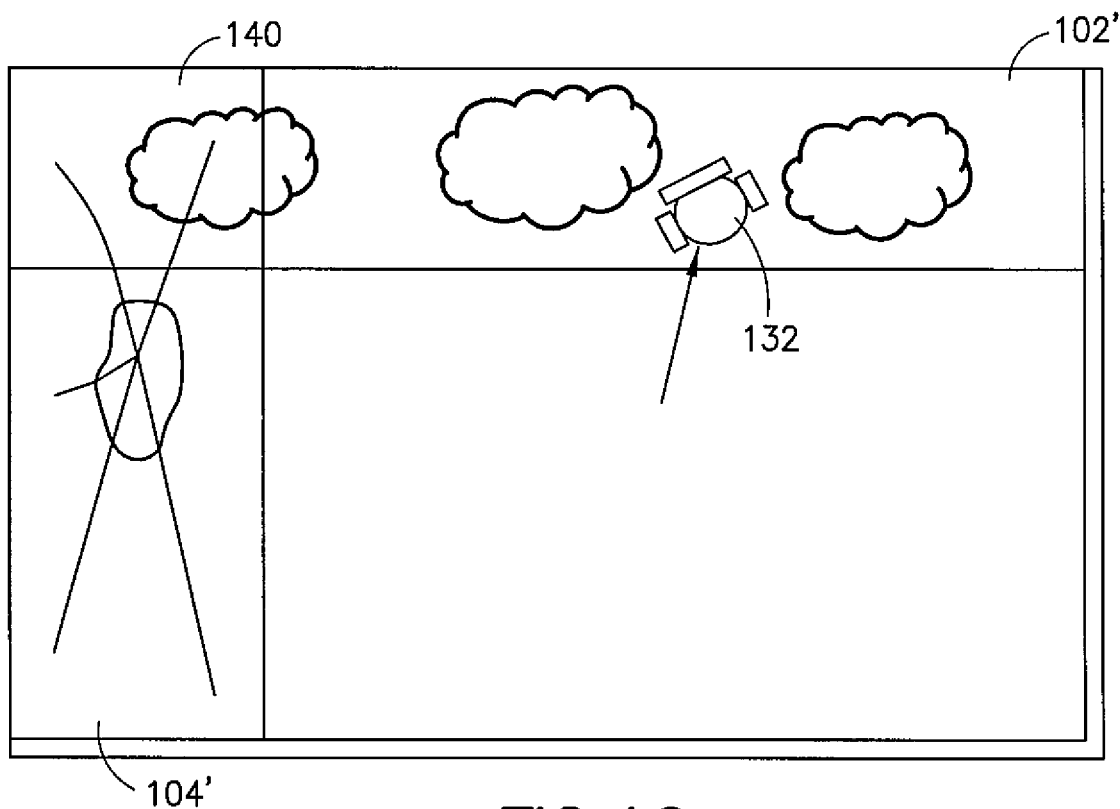
FIGS. 16a-16d are plan views useful for understanding the FIG. 15 processing steps.
Figure 16B:
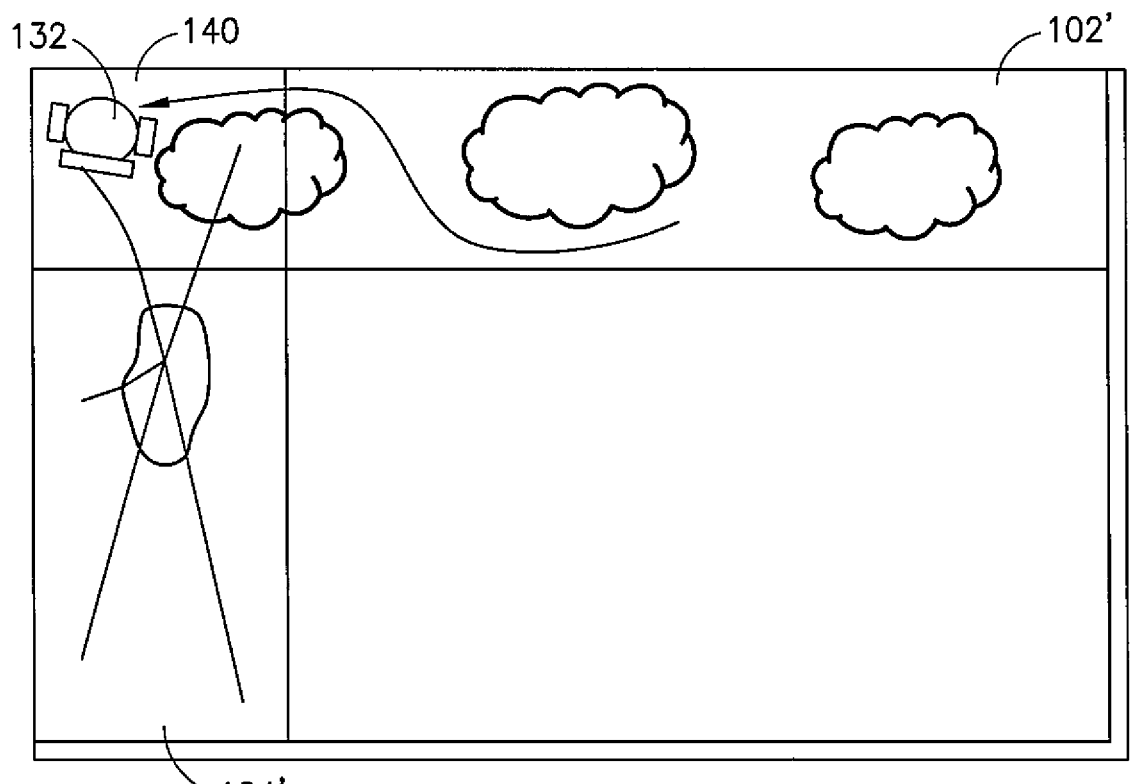

FIG. 16a shows the user 132 positioned within the first virtual world 102'. Accordingly, from the user's viewpoint, the rendered virtual content corresponds only to the first virtual world 102' within which they are immersed and may explore using 6DoF. Referring to FIG. 16b, the user explores the first virtual world 102' and subsequently enters the overlapping zone 140 with the second virtual world 104'. In this case, the user continues to see only the first virtual world 102' at the respective position. The first virtual world 102' dominates and is not transparent. The user 132 does not see any of the second virtual world 104' which is shown in feint line for reference purposes only.

Figure 16C:
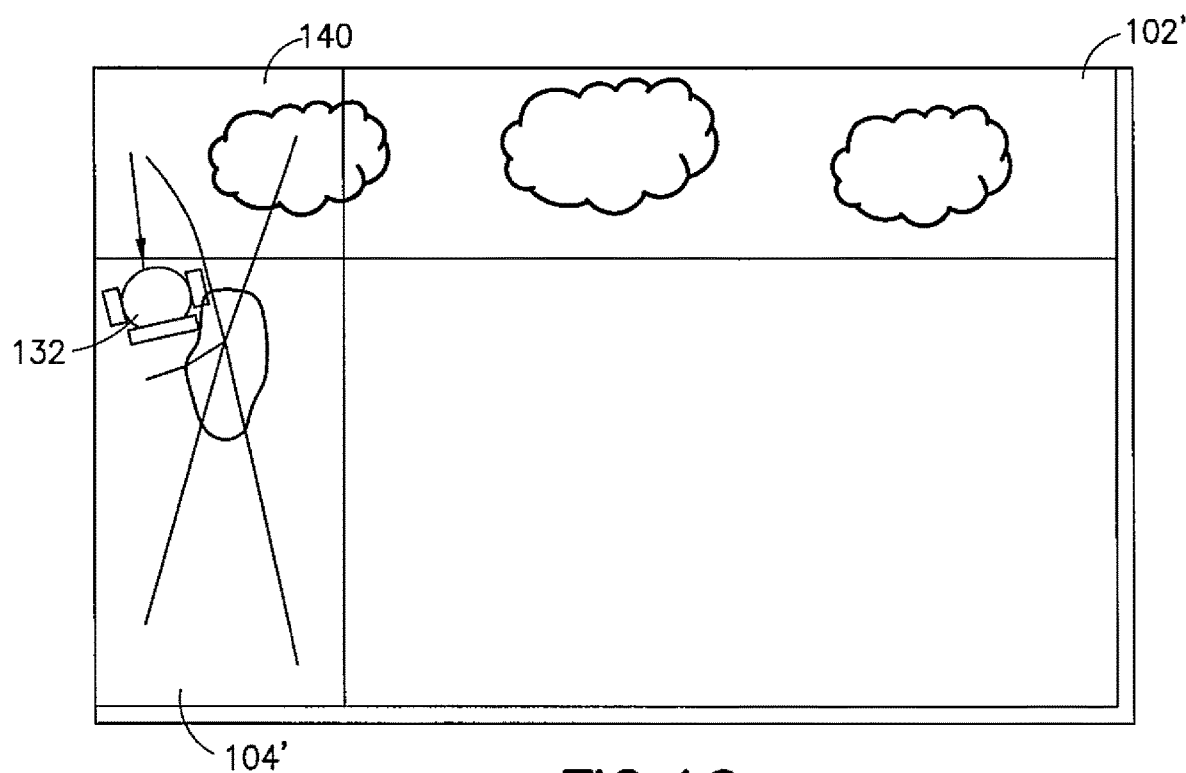
Figure 16D:
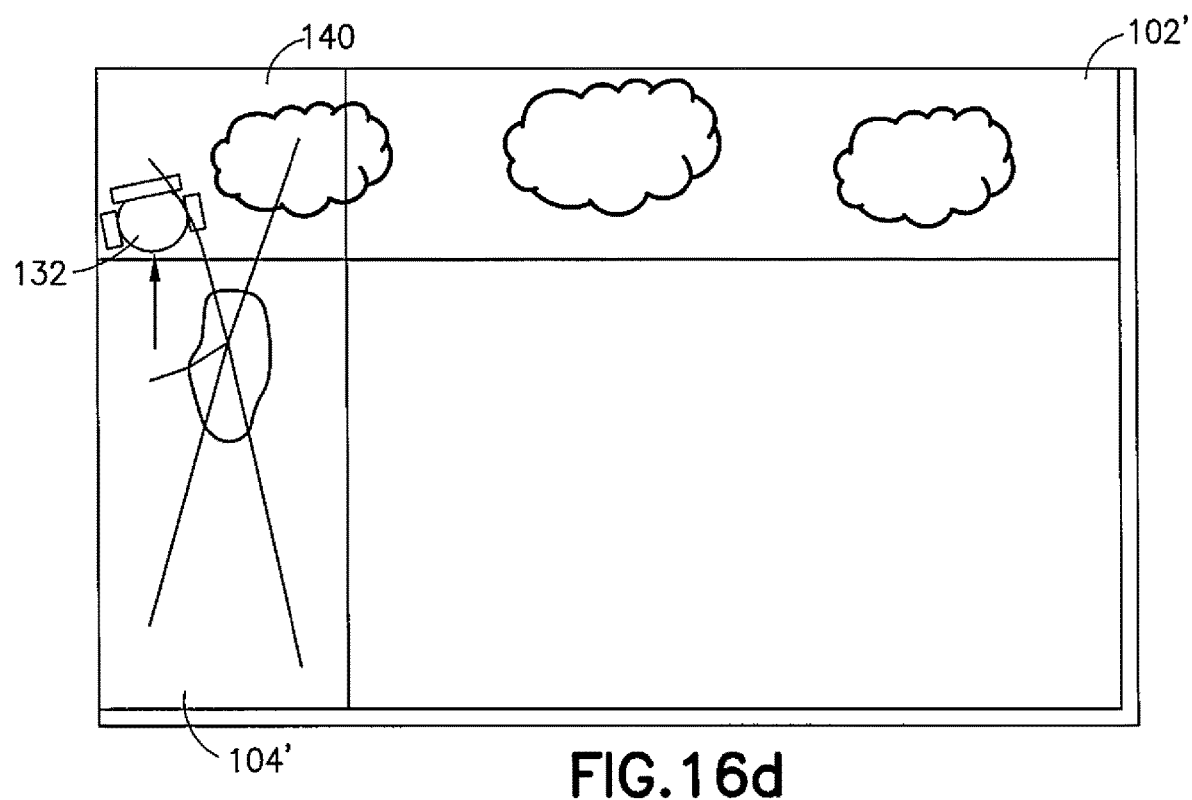

Referring to FIG. 16c, if the user 132 subsequently transitions from the overlapping zone 140 into the second virtual world 104', the rendered virtual content switches to show only the second virtual world 104' within which the user is immersed and may explore. Referring to FIG. 16d, if the user explores the second virtual world 104' and re-enters the overlapping zone with the first virtual world 102', the user continues to see only the second virtual world 104' at the respective position. The user 132 does not see any of the first virtual world 102' which is shown in feint line for reference purposes only.

In some example embodiments, each portion of the real-world space may be associated with a plurality of virtual worlds. For example, referring back to FIGS. 13a and 13b, a playlist of virtual worlds may be associated with one or more walls. Transitioning between different virtual worlds of the playlist may be dependent on a parameter or on user interaction. For example, each of said virtual worlds may have an associated time parameter indicative of a time period; when the user 132 is immersed in the respective virtual world for the time period, said virtual world may diminish, e.g. slide back to its respective wall, and may be replaced with the next virtual world in the playlist. Thus, an even greater number of virtual worlds may be provided and explored within the real-world space 100 of limited dimensions.

Figure 17:
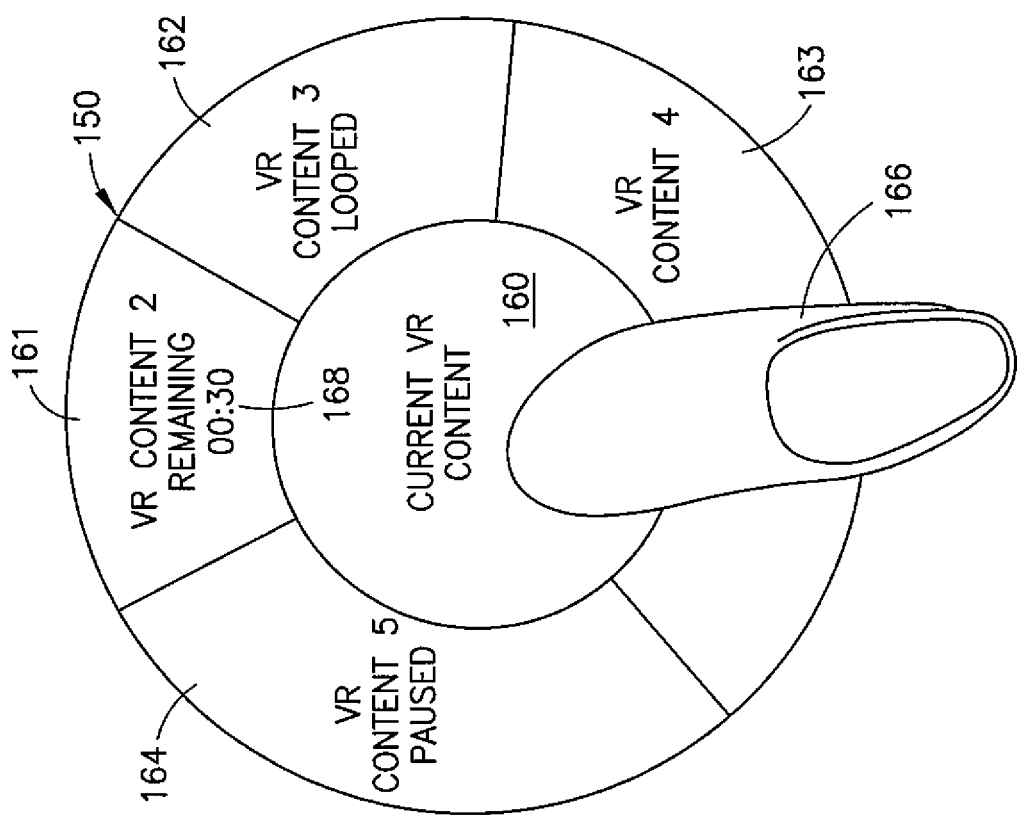
FIG. 17 is a top plan view of a graphical user interface, according to a further example embodiment of the invention, for user-selection of virtual worlds.

In some example embodiments, further or alternative methods of user interaction may be provided. FIG. 17 is a top plan view of an example graphical user interface (GUI) 150 which may be rendered proximate to the user's current position, at or near the floor of the real-world space 100. The GUI 150 is therefore suited to user-selection by means of a user's foot 166, as shown. In use, the user may simply look downwards towards the 'virtual floor' and select (or deselect) a particular virtual world using foot gestures, thereby additionally using the limited space efficiently and intuitively. In some example embodiments, user-selection may be achieved by a hand gesture, e.g. pointing.

The GUI 150, when rendered, provides user-selectable representations of the N virtual worlds, arranged as respective segments 160-164. A first segment 160 which may be provided generally central of the GUI 150 may represent a current virtual world, i.e. one that the user is currently immersed in. If the user is currently outside of any virtual world, the first segment 160 may or may not be present. Each of the other segments 161-164 may be arranged around the central segment, representing other virtual worlds as well as their relative positions and/or directions in the real world space 100. The GUI 150 may be considered a form of interactive compass.

In use, selection of the first segment 160 may be effective to diminish, de-select or close the current virtual world. Other, already-selected virtual worlds may be indicated differently than unselected ones, e.g. by using a different colour or other marking. In order to select another virtual world, the user simply stands or places their foot proximate to the corresponding segment, e.g. the segment 161 corresponding to a second virtual world, causing it to expand as previously described. If the user subsequently moves into the second virtual world, the representation may swap places with the central segment 160.

As shown, each of the segments 160-164 may display a label (whether text, an image and/or video clip) indicative of the virtual world represented. Additional information may also be provided, for example a time period 168 associated with the duration of the virtual world, if appropriate. Other examples of such information may include the status of the virtual world, e.g. whether it is in a paused state, is looped content etc.

Figure 18:
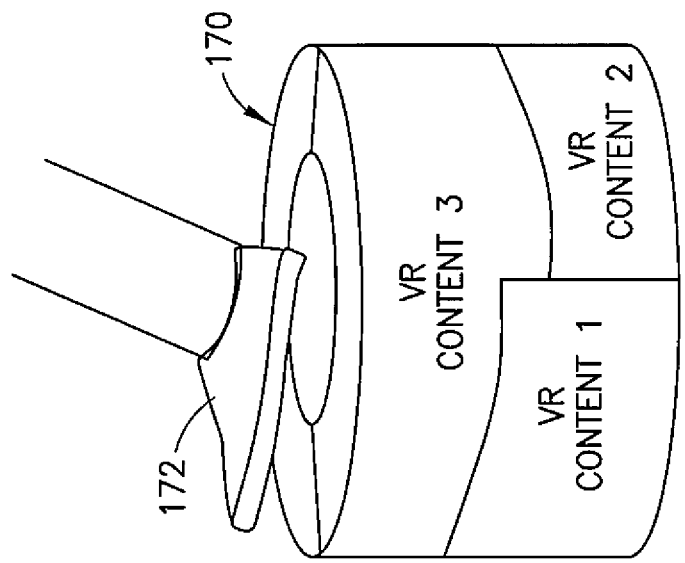
FIG. 18 is a perspective view of a graphical user interface, according to a further example embodiment of the invention, for user selection of virtual worlds.

FIG. 18 is a perspective view of a further GUI 170 which, similar to the FIG. 17 GUI 150, may be rendered proximate to the user's current position, at or near the floor of the real-world space zoo. Selection may be by means of a user's foot 172 or a hand gesture. The GUI 170 in this case is rendered in three-dimensions, which may be appropriate when a virtual world is placed vertically on top of one or more other virtual world(s). Similar to the Figure r GUI, the GUI 170 provides a form of interactive compass, enabling selection and de-selection of multiple virtual worlds using a limited amount of real-world space.

Figure 19:
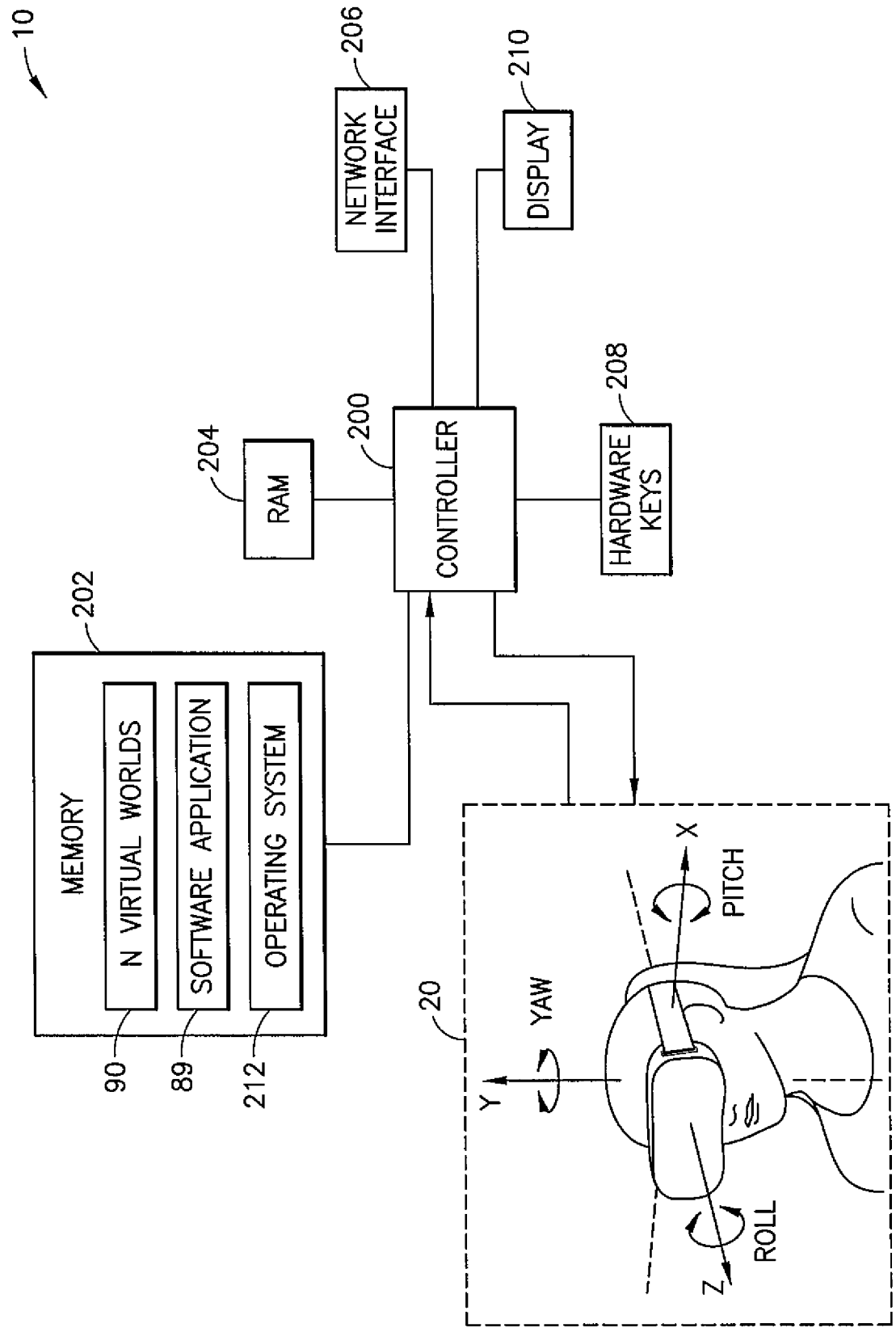
FIG. 19 is a schematic diagram of components of a VR media player in accordance with an example embodiment.

As mentioned above, in alternative example embodiments, the software application 89 and/or the N virtual worlds 90 may be provided locally at the user end, for example in the VR media player 10. Accordingly, for completeness, FIG. 19 shows a schematic diagram of components of the VR media player 10. The VR media player 10 may have a controller 200, memory 202 and RAM 204. The VR media player 10 may comprise a network interface 206 for connection to the network 40, e.g. a modem which may be wired or wireless. The VR media player 10 may also receive positional signals from the VR headset 20 and outputs video and/or audio content for one or more virtual worlds to the VR headset 20. The positional signals may be indicative of user position/orientation. The controller 200 is connected to each of the other components in order to control operation thereof.

The memory 202 may be a non-volatile memory such as read only memory (ROM), a hard disk drive (HDD) or a solid state drive (SSD). The memory 202 stores, amongst other things, an operating system 212 and the software application 89. The RAM 204 is used by the controller 200 for the temporary storage of data. The operating system 212 may contain code which, when executed by the controller 200 in conjunction with the RAM 204, controls operation of each of the hardware components.

Additionally, the memory 202 may store the N virtual worlds 90 which may be a library of virtual content arranged in any suitable form. The N virtual worlds 90 may comprise three-dimensional volumetric items, for example virtual worlds and/or objects.

The controller 200 may take any suitable form. For instance, it may be a microcontroller, plural microcontrollers, a processor, or plural processors.

In some example embodiments, the VR media player 10 may also be associated with external software applications or VR content data not stored on the memory 202. These may be applications or VR content data stored on a remote server device and may run partly or exclusively on the remote server device. These applications or VR content data may be termed cloud-hosted applications or data. The VR media player 10 may be in communication with the remote server device in order to utilize the software application or data stored there.

The above example embodiments therefore provided an intuitive and useful way of indicating to a user multiple virtual worlds or objects suitable for display within a given real-world space of limited dimensions. A user may also transition between multiple worlds within the limited space, which may provide a useful way of progressing through different types of content.

It will be appreciated that the above described example embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
providing a plurality of sets of virtual reality video content, the sets representing respective three-dimensional virtual spaces associated with respective three-dimensional portions of a real-world space such that, when rendered with a user device, there is a partial overlap between at least two virtual spaces defining one or more overlapping zones, wherein the real-world space is a space in which at least one of the plurality of sets of virtual reality video content is consumed;
determining a position and/or movement and/or orientation of a user within the real-world space;
rendering one or more of the respective virtual spaces for display with the user device dependent on the determined position and/or movement and/or orientation within the real-world space; and
rendering user-selectable representations indicative of the one or more virtual spaces with the user device.

2. The method of claim 1, wherein selection of a particular representation causes its respective virtual space to be rendered at least partially within its associated portion of the real-world space.

3. The method of claim 2, wherein selection of a particular representation causes the respective virtual space to expand into the associated portion of the real-world space.

4. The method of claim 1, wherein at least one rendered user-selectable representation is user-selectable by means of detecting a user gesture.

5. The method of claim 1, wherein at least one user-selectable representation is rendered so as to appear on or adjacent a respective wall or upright surface of the real-world space.

6. The method of claim 1, further comprising providing a user-interface for rendering with the user device, the user-interface configured to appear to the user to be proximate to the determined position and at or near a floor of the real-world space, the user-interface when rendered comprising the user-selectable representations arranged as respective segments indicative of relative spatial locations or directions of the one or more virtual spaces.

7. The method of claim 6, wherein the user-interface, when rendered, comprises a central segment indicative of a current virtual space within which the user is immersed and one or more outer segments indicative of one or more other of the one or more virtual spaces.

8. The method of claim 1, wherein a rendered overlapping zone of the one or more defined overlapping zones for first and second virtual spaces comprises video content from the first and second virtual spaces where the determined position is outside of the respective portions of the real-world space associated with the first and second virtual spaces.

9. The method of claim 1, wherein the determined position is within a portion of the real-world space associated with a first virtual space, outside of an overlapping zone with a second virtual space, the first virtual space is rendered with the user device, and the second virtual space is not rendered with the user device.

10. The method of claim 9, wherein the determined position subsequently moves from the portion of the real-world space associated with said first virtual space to within the overlapping zone with the second virtual space, the first virtual space is rendered with the user device, and the second virtual space is not rendered with the user device.

11. The method of claim 10, wherein the determined position subsequently moves from the overlapping zone to a portion of the real-world space associated with said second virtual space, the second virtual space is rendered with the user device, and the first virtual space is not rendered with the user device.

12. The method of claim 1, wherein a plurality of different virtual spaces are associated with a same portion of the real-world space, rendering at least one of the plurality of different spaces, and rendering at least one other of the plurality of different virtual spaces in place of the at least one virtual space dependent on a parameter or user interaction.

13. The method of claim 1, wherein the one or more defined overlapping zones are associated with respective three-dimensional portions of the real-world space.

14. A computer program embodied on a non-transitory computer-readable storage medium comprising instructions that when executed with at least one processor, causes the at least one processor to perform:
provide a plurality of sets of virtual reality video content, the sets representing respective three-dimensional virtual spaces associated with respective three-dimensional portions of a real-world space such that, when rendered with a user device, there is a partial overlap between at least two virtual spaces defining one or more overlapping zones, wherein the real-world space is a space in which at least one of the plurality of sets of virtual reality video content is consumed;

determine a position and/or movement and/or orientation of a user within the real-world space;

render one or more of the respective virtual spaces for display with the user device dependent on the determined position and/or movement and/or orientation within the real-world space; and render user-selectable representations indicative of the one or more virtual spaces with the user device.

15. The computer program embodied on the non-transitory computer-readable storage medium of claim 14, wherein a rendered overlapping zone of the one or more defined overlapping zones for first and second virtual spaces comprises video content from the first and second virtual spaces where the determined position is outside of the respective portions of the real-world space associated with the first and second virtual spaces.

16. The computer program embodied on the non-transitory computer-readable storage medium of claim 14, wherein where the determined position is within a portion of the real-world space associated with a first virtual space, outside of an overlapping zone with a second virtual space, the first virtual space is rendered with the user device, and the second virtual space is not rendered with the user device.

17. An apparatus comprising:
at least one processor; and
at least one non-transitory memory including computer program code, wherein the at least one memory and the computer program code are configured, with the at least one processor, to cause the apparatus at least to perform:

provide a plurality of sets of virtual reality video content, the sets representing respective three-dimensional virtual spaces associated with respective three-dimensional portions of a real-world space such that, when rendered with a user device, there is a partial overlap between at least two virtual spaces defining one or more overlapping zones, wherein the real-world space is a space in which at least one of the plurality of sets of virtual reality video content is consumed;

determine a position and/or movement and/or orientation of a user within the real-world space;

render one or more of the respective virtual spaces for display with the user device dependent on the determined position and/or movement and/or orientation within the real-world space; and render user-selectable representations indicative of the one or more virtual spaces with the user device.

18. The apparatus of claim 17, wherein a rendered overlapping zone of the one or more defined overlapping zones for first and second virtual spaces comprises video content from the first and second virtual spaces where the determined position is outside of the respective portions of the real-world space associated with the first and second virtual spaces.

19. The apparatus of claim 17, wherein where the determined position is within a portion of the real-world space associated with a first virtual space, outside of an overlapping zone with a second virtual space, the first virtual space is rendered with the user device, and the second virtual space is not rendered with the user device.

* * * * *